(12) United States Patent
Takahashi et al.

(10) Patent No.: US 11,756,361 B2
(45) Date of Patent: Sep. 12, 2023

(54) STORAGE CASE, AND VEHICLE LENDING AND BORROWING SYSTEM

(71) Applicant: ALPS ALPINE CO., LTD., Tokyo (JP)

(72) Inventors: Seishi Takahashi, Miyagi (JP); Nobuaki Oka, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 101 days.

(21) Appl. No.: 17/651,269

(22) Filed: Feb. 16, 2022

(65) Prior Publication Data

US 2022/0172541 A1 Jun. 2, 2022

Related U.S. Application Data

(63) Continuation of application No. PCT/JP2020/035320, filed on Sep. 17, 2020.

(30) Foreign Application Priority Data

Sep. 18, 2019 (JP) .................................. 2019-169684

(51) Int. Cl.
*G07C 9/29* (2020.01)
*G07C 9/00* (2020.01)

(52) U.S. Cl.
CPC ........... *G07C 9/29* (2020.01); *G07C 9/00309* (2013.01); *G07C 2009/00476* (2013.01); *G07C 2009/00769* (2013.01)

(58) Field of Classification Search
CPC .. G07C 9/29; G07C 9/00309; G07C 9/00912; G07C 9/00944; G07B 15/00; G06K 19/00

USPC ......................................... 235/382, 380, 375
See application file for complete search history.

(56) References Cited

U.S. PATENT DOCUMENTS

2020/0299998 A1    9/2020 Testa et al.

FOREIGN PATENT DOCUMENTS

| JP | 2003-113683 | 4/2003 |
|----|-------------|--------|
| JP | 2009-264013 | 11/2009 |
| JP | 2017-215880 | 12/2017 |
| JP | 2019-512630 | 5/2019 |

OTHER PUBLICATIONS

International Search Report for PCT/JP2020/035320 dated Nov. 10, 2020.

*Primary Examiner* — Edwyn Labaze
(74) *Attorney, Agent, or Firm* — IPUSA, PLLC

(57) ABSTRACT

A storage case for being provided in a vehicle includes a case body having a storage space for an electronic key; a first actuator to protrude into the storage space and pressing an unlocking button of the electronic key in the storage space; a second actuator; an adjustment piece for adjusting positions of the first actuator and the second actuator; a transceiver for communicating with an external terminal apparatus; and a processor to, in response to the transceiver receiving an unlocking request signal transmitted from the external terminal apparatus, cause the first actuator to press the unlocking button. The adjustment piece includes a rotating plate rotatably provided with respect to the case body; and, with respect to the rotating plate, the first and the second actuators being adjustable to become nearer to each other and adjustable to become farther from each other.

8 Claims, 20 Drawing Sheets

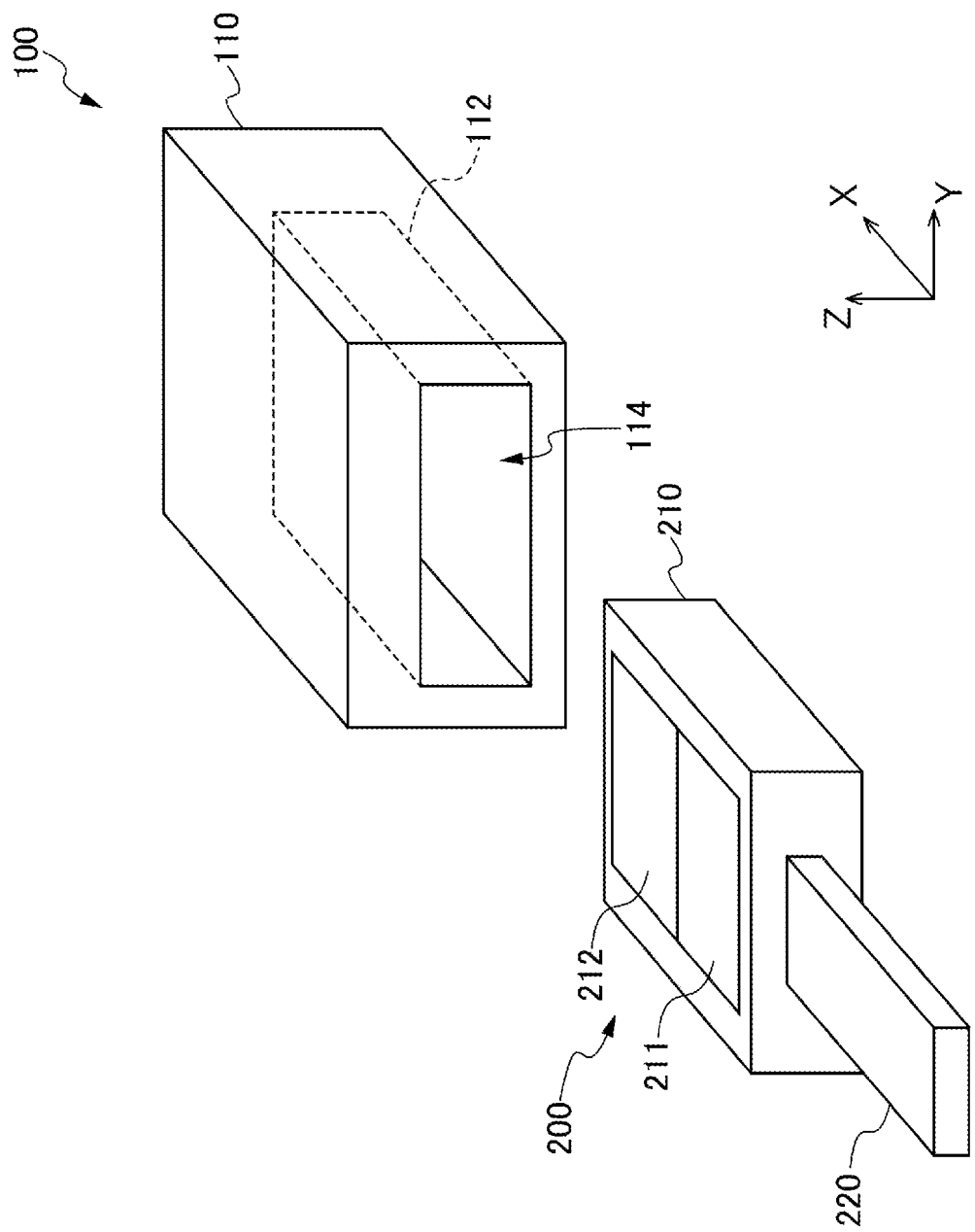

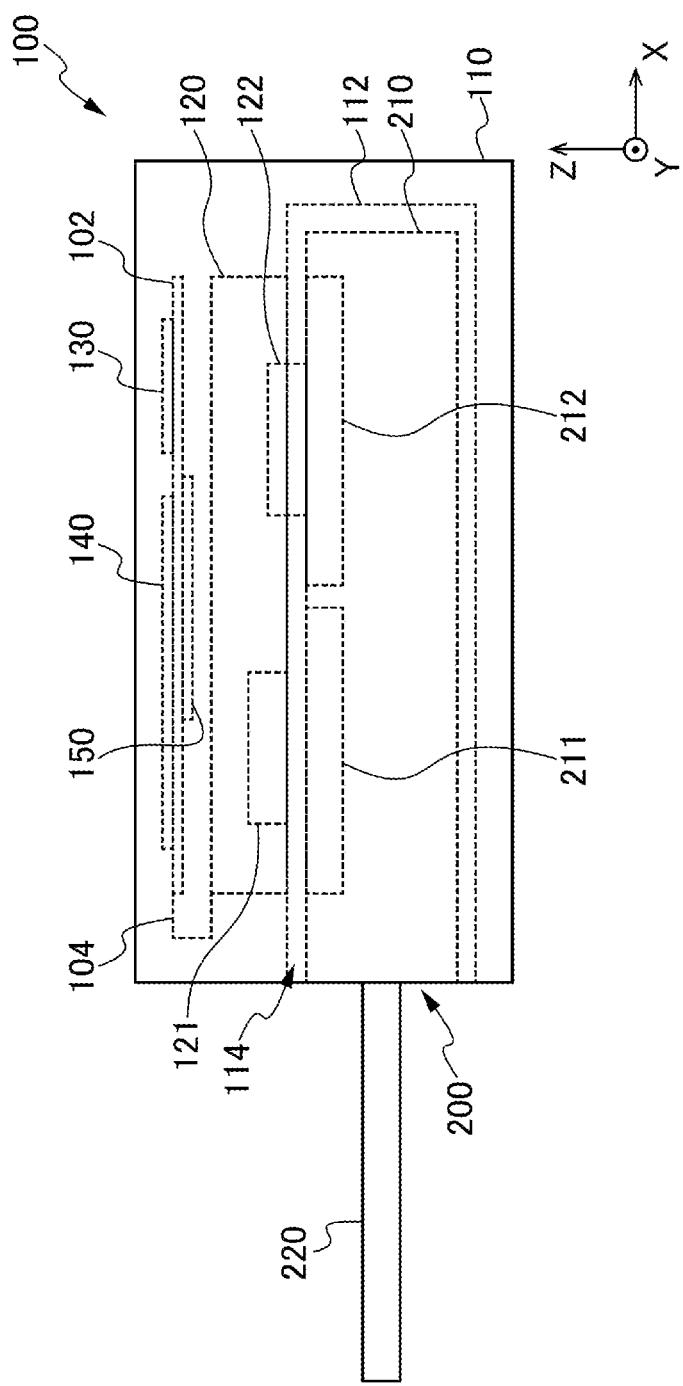

FIG.17B
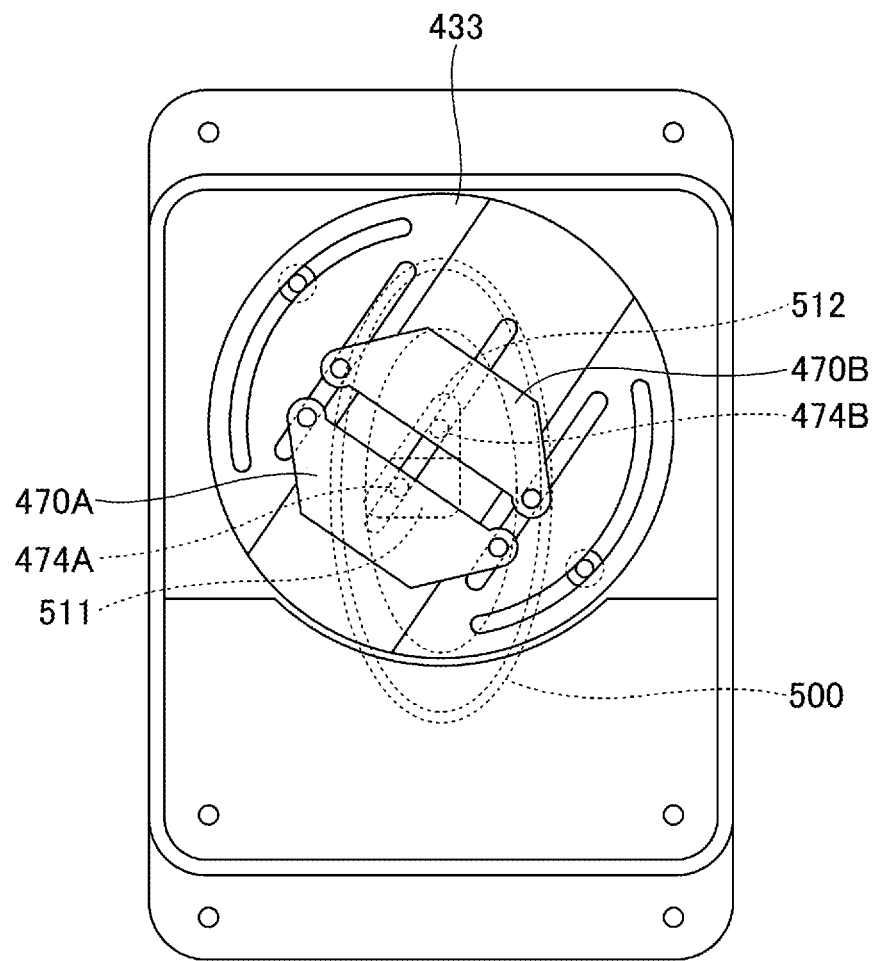
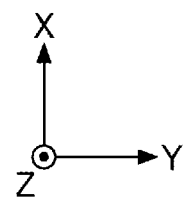

STORAGE CASE, AND VEHICLE LENDING AND BORROWING SYSTEM

CROSS-REFERENCE TO RELATED APPLICATION

The present application is a continuation filed under 35 U.S.C. 111 (a) claiming the benefit under 35 U.S.C. 120 and 365 (c) of PCT International Application No. PCT/JP2020/035320 filed on Sep. 17, 2020, and designating the U.S., which is based on and claims priority to Japanese Patent Application No. 2019-169684, filed on Sep. 18, 2019. The entire contents of the PCT International Application No. PCT/JP2020/035320 and the Japanese Patent Application No. 2019-169684 are incorporated herein by reference.

BACKGROUND OF THE INVENTION

1. Field of the Invention

The present invention relates to a storage case, and a vehicle lending and borrowing system.

2. Description of the Related Art

For example, Patent Document 1, mentioned below, discloses a technique in which a key-storage box storing a key of a vehicle is placed outside the vehicle, and only a user who is authorized to use the vehicle can unlock the key-storage box to obtain the key. According to this technology, the key of the vehicle can be delivered to the specific user unattended without modifying the vehicle.

CITATION LIST

[Patent Document 1] Japanese Patent Application Publication No. 2017-215880

SUMMARY OF THE INVENTION

Technical Problem

However, in the above-described technology of Patent Document 1, it is necessary to set the key-storage box outside the vehicle. For this reason, the technology of Patent Document 1 described above may result in the theft of or damage to the key-storage box. Also, a presence of the key in the key-storage box may be readily apparent to a third party and this may not be desirable from a security viewpoint. In addition, the key-storage box may cause damage to the exterior of the vehicle.

Solution to Problem

A storage case according to an embodiment is configured to be provided in a vehicle, and includes a case body including a storage space for an electronic key; a first actuator including a first pressing piece configured to protrude into the storage space, the first actuator being configured to press at least an unlocking button of the electronic key stored in the storage space with the first pressing piece; a second actuator including a second pressing piece configured to protrude into the storage space, the second actuator being configured to press at least a locking button of the electronic key stored in the storage space with the second pressing piece; an adjustment piece configured to adjust a position of the first actuator and adjust a position of the second actuator; a transceiver configured to communicate with an external terminal apparatus; and a processor configured to, in response to the transceiver receiving an unlocking request signal transmitted from the external terminal apparatus, cause the first actuator to press the unlocking button. The adjustment piece includes a rotating plate rotatably provided with respect to the case body, and the first actuator and the second actuator are adjustable in positions with respect to the rotating plate to become nearer to each other and adjustable in positions with respect to the rotating plate to become farther from each other.

Advantageous Effects of the Invention

According to the embodiment, a key of a vehicle can be delivered in a non-face-to-face manner without a key-storage box being provided on the exterior of the vehicle.

BRIEF DESCRIPTION OF THE DRAWINGS

Other objects, features and advantages of the present invention will become more apparent from the following detailed description when read in conjunction with the accompanying drawings:

FIG. 1 is a perspective view of an external appearance of a storage case and an electronic key according to one embodiment.

FIG. 2B is a side view of the storage case (in a state in which the electronic key is stored) according to the embodiment.

FIG. 17B depicts an example of adjusting the positions of the actuators in the storage case according to the second embodiment.

DETAILED DESCRIPTION OF THE PREFERRED EMBODIMENTS

Figure 2A:
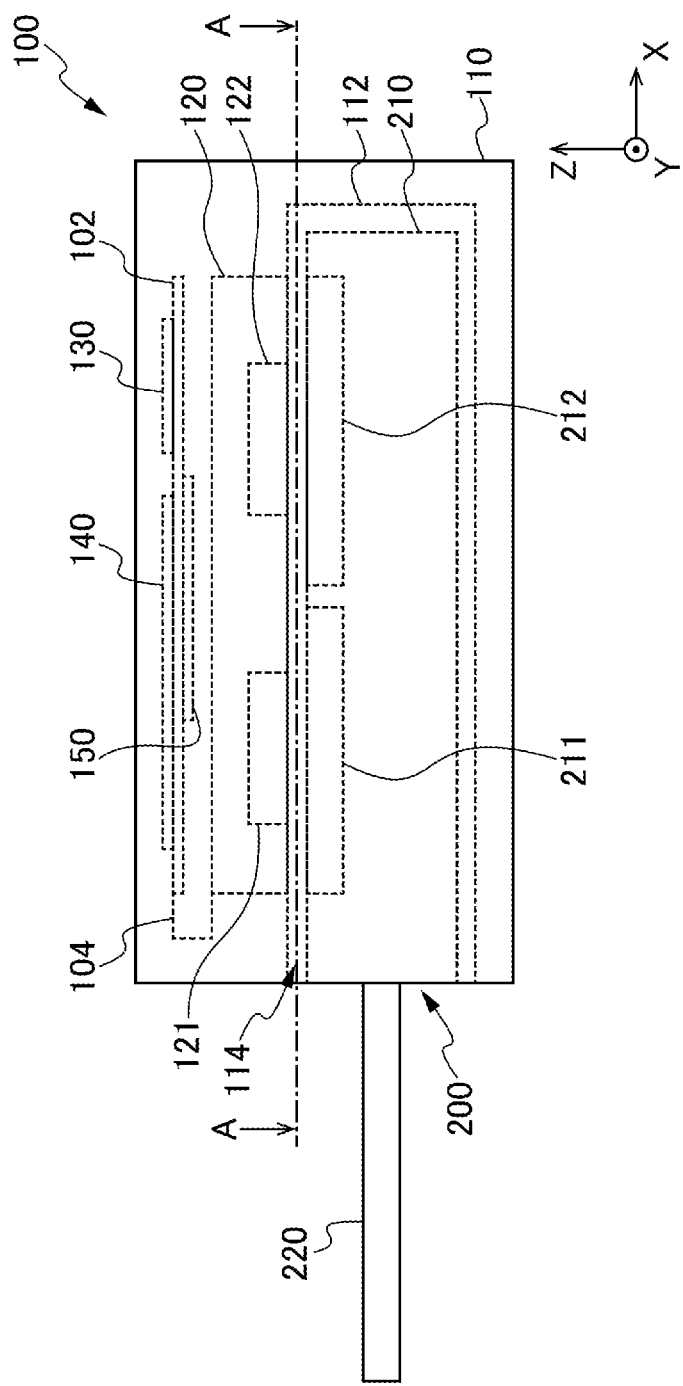
FIG. 2A is a side view of the storage case (in a state in which an electronic key is stored) according to the embodiment.

Hereinafter, embodiments will be described with reference to the drawings.
(Overview of Storage Case 100 and Electronic Key 200)

FIG. 1 is a perspective view of a storage case 100 and an electronic key 200 according to an embodiment. In the following description, for convenience, an X-axis direction in drawings (i.e., the longer-side direction with respect to the storage case 100) is set to a back and forth direction, a Y-axis direction in the drawings (i.e., a shorter-side direction with respect to the storage case 100) is set to a right and left direction, and a Z-axis direction in the drawings (i.e., a thickness direction with respect to the storage case 100) is set to an up and down direction.

The electronic key 200 is a portable key device carried by a vehicle user; the electronic key 200 and an in-vehicle device (not depicted) mounted in the vehicle are included in an electronic key system.

As depicted in FIG. 1, the electronic key 200 includes a case 210 and a key plate 220. The case 210 is a container-like part having a generally thin rectangular shape formed of a resin material such as an ABS resin, a PC resin, or the like.

An unlocking button 212 and a locking button 211 are exposed on an upper surface of the case 210. Both the unlocking button 212 and the locking button 211 can be pressed by a user. When the unlocking button 212 or the locking button 211 is pressed by a user, the electronic key 200 transmits an operation signal to the in-vehicle device for unlocking or locking a locking mechanism of doors of the vehicle through radio communication with the in-vehicle device. This allows the electronic key 200 to remotely unlock or lock the locking mechanism of the vehicle door.

The key plate 220 is a metallic and elongated plate-like part that extends linearly backward (in the X-axis negative direction) from a back-side (the X-axis negative side) side surface of the case 210. The key plate 220 is inserted into a key cylinder provided in the vehicle to be able to mechanically rotate the key cylinder.

The storage case 100 is configured to store the electronic key 200 and can be set at a desired place in the vehicle. The storage case 100 includes a case body 110. The case body 110 includes a storage space 112 configured to store the electronic key 200. The storage space 112 has substantially the same shape as an outer shape of the case 210 of the electronic key 200 and may be slightly larger than the outer shape of the case 210.

The case body 110 has an opening 114 in the back-side (at the X-axis negative side) side surface. As depicted in FIG. 1, the electronic key 200 can be inserted into the storage space 112 and removed from the storage space 112 through the opening 114 in a state where the key plate 220 of the electronic key 200 faces backward (in the X-axis negative direction) and the upper surface of the electronic key 200 faces upward (in the Z-axis positive direction).
(Configuration of Storage Case 100)

FIGS. 2A and 2B are side views of the storage case 100 (in a state in which the electronic key 200 is stored) according to the embodiment. FIG. 2A depicts that the unlocking button 212 of the electronic key 200 is not pressed by a solenoid 120. FIG. 2B depicts that the unlocking button 212 of the electronic key 200 is pressed by the solenoid 120.

As depicted in FIGS. 2A and 2B, the storage case 100 includes the solenoid 120, a communication module 130, a controller 140, and a battery 150.

The solenoid 120 is provided above the storage space 112 inside the case body 110. The solenoid 120 is connected to a circuit board 102 by a wiring member 104, such as an FPC. This allows the solenoid 120 to receive a control signal and power from the circuit board 102 via the wiring member 104. The solenoid 120 has a pressing part 121 and a pressing part 122.

The pressing part 121 faces the locking button 211 of the electronic key 200. The pressing part 121 protrudes toward the storage space by being driven downward by electromagnetic force. This allows the pressing part 121 to press the locking button 211.

The pressing part 122 faces the unlocking button 212 of the electronic key 200. The pressing part 122 protrudes toward the storage space by being driven downward by electromagnetic force. This allows the pressing part 122 to press the unlocking button 212.

The communication module 130 is an example of a "transceiver". The communication module 130 is mounted on the circuit board 102, such as a printed wiring board (PWB). The communication module 130 transmits and receives various data from and to a smartphone 300 by performing wireless communication with the smartphone 300 (an example of an "external terminal apparatus"). For example, the communication module 130 receives an unlocking request signal transmitted from the smartphone 300. For wireless communication between the communication module 130 and the smartphone 300, for example, Bluetooth (registered tradename) is used.

The controller 140 is mounted on the circuit board 102. The controller 140 controls the entire storage case 100. For example, the controller 140 authenticates the smartphone 300, controls the solenoid 120, and so forth. For example, an integrated circuit (IC) may be used as the controller 140.

The battery 150 is mounted on the circuit board 102. The battery 150 supplies power to each of the units (the solenoid 120, the communication module 130, and the controller 140) of the storage case 100. One of various primary batteries or one of various secondary batteries can be used as the battery 150. It should be noted that the storage case 100 may use an external power source instead of the battery 150.
(Function of Holding Electronic Key 200 by Leaf Springs 116)

Figure 3:
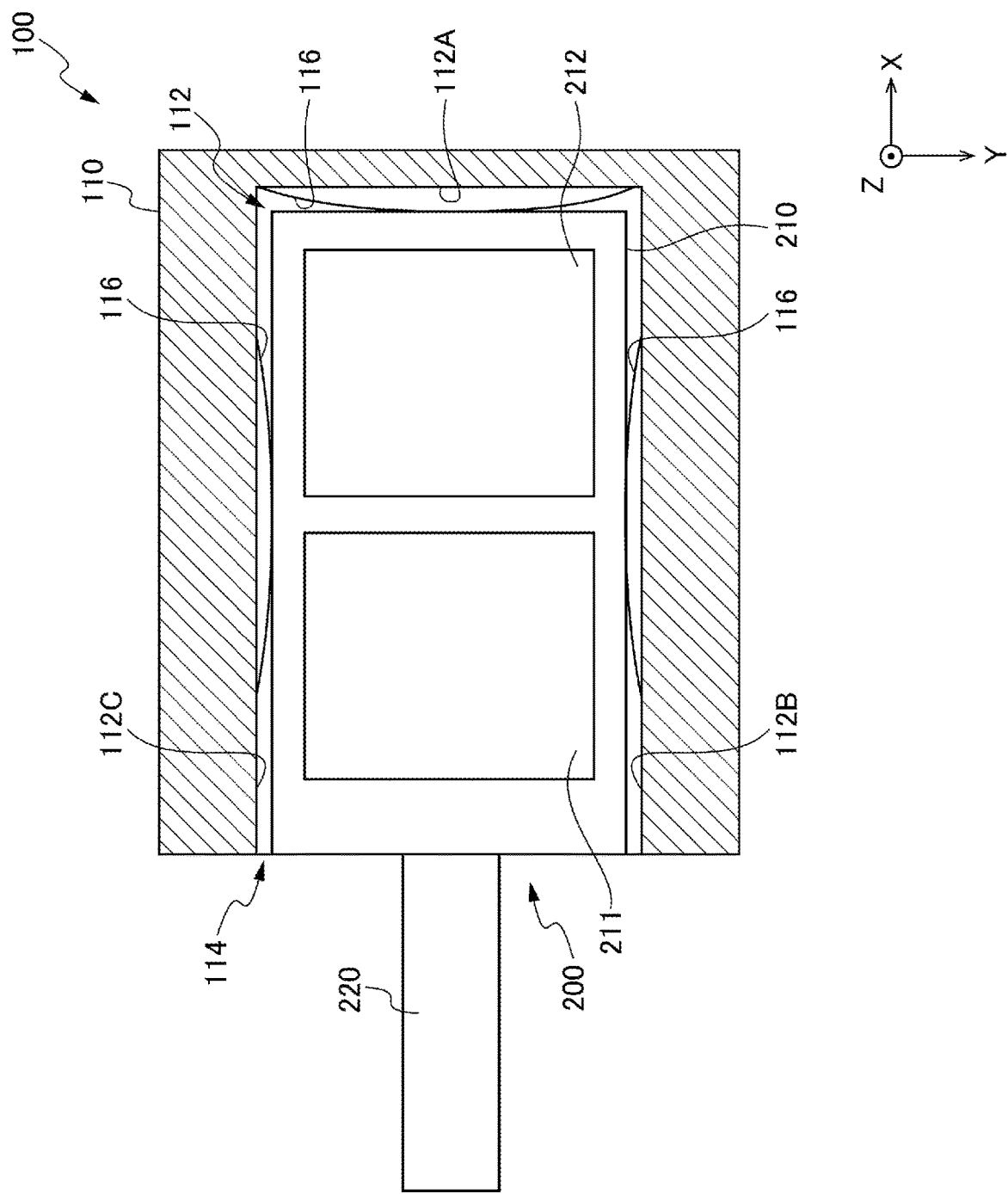
FIG. 3 is an A-A cross-sectional view of the storage case depicted in FIG. 2A.

FIG. 3 is an A-A a cross-sectional view of the storage case 100 depicted in FIG. 2A. As depicted in FIG. 3, the case body 110 is provided with respective leaf springs 116 that are curved to protrude toward the inside of the storage space 112 on an inner wall surface 112A of the storage space 112 at an X-axis positive side, an inner wall surface 112B of the storage space 112 at a Y-axis positive side, and an inner wall surface 112C of the storage space 112 at a Y-axis negative side.

The leaf springs 116 are examples of an "elastically deformable piece". The leaf springs 116 press the side surfaces of the case 210 of the electronic key 200 facing the leaf springs 116. The leaf springs 116 can be elastically deformed in accordance with a size of the case 210. Thus, the leaf springs 116 can press the side surfaces of the case 210 regardless of the size of the case 210 to avoid shaking of the case body 110 in the storage space 112.

Thus, the storage case 100 according to the present embodiment can stably store and hold any one of a plurality of types of electronic keys 200 having the cases 210 in a variety of sizes.

(System Configuration of Vehicle Lending and Borrowing System 10)

Figure 4:
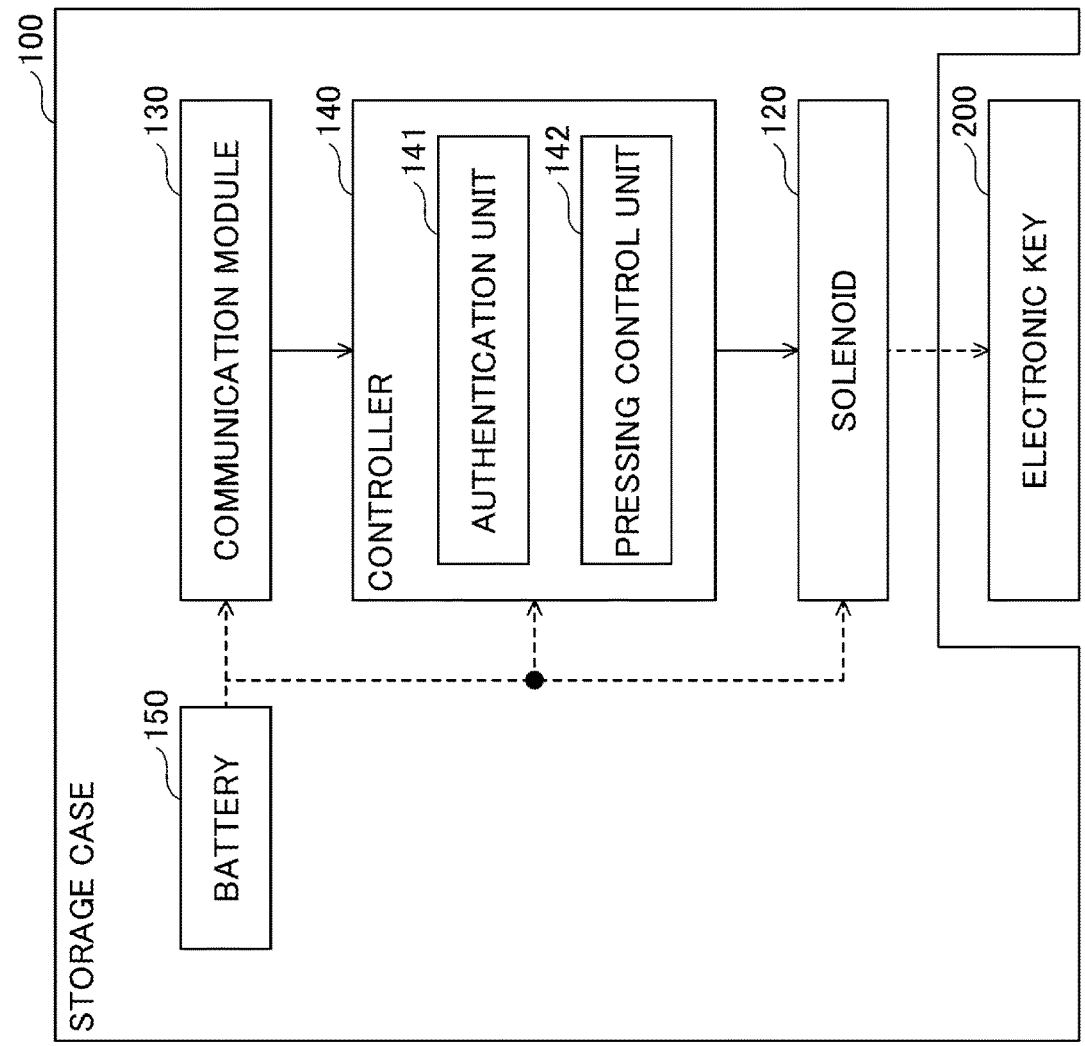
FIG. 4 is a diagram depicting a system configuration of a vehicle lending and borrowing system according to an embodiment.

FIG. 4 is a diagram depicting a system configuration of a vehicle lending and borrowing system 10 according to an embodiment. The vehicle lending and borrowing system 10 depicted in FIG. 4 includes the storage case 100, the electronic key 200, the smartphone 300, and a server 350.

As depicted in FIG. 4, the controller 140 of the storage case 100 includes an authentication unit 141 and a pressing control unit 142.

The authentication unit 141 authenticates the smartphone 300. Specifically, when the communication module 130 receives an unlocking request signal from the smartphone 300, the authentication unit 141 authenticates the smartphone 300 based on certificate information included in the unlocking request signal.

The pressing control unit 142 controls a pressing operation of the solenoid 120. For example, when the authentication unit 141 has successfully authenticated the smartphone 300, the pressing control unit 142 transmits a predetermined unlocking control signal to the solenoid 120 so that the pressing part 121 of the solenoid 120 performs the pressing operation on the unlocking button 212.

Various functions of the controller 140 are implemented, for example, by executing a program stored in a memory by a processor in the controller 140.

As depicted in FIG. 4, the smartphone 300 is connected to the server 350 via a communication network 12 such as the Internet. The server 350 manages the vehicle lending and borrowing system 10. For example, the server 350 includes a reservation managing unit 351 and a certificate information providing unit 352. The reservation managing unit 351 manages reservation data with respect to vehicles registered from smartphones through the communication network 12. The reservation data includes information such as users, periods of use, and locations of use. The certificate information providing unit 352 provides certificate information to a borrower (for example, a borrower who has completed a payment of a usage fee) who is authorized to use a vehicle, among borrowers registered in the reservation data, and transmits the certificate information to the borrower's smartphone 300 via the communication network 12. This allows the smartphone 300 to unlock the vehicle using the certificate information.

The certificate information transmitted to the smartphone 300 is also previously registered in the controller 140 of the storage case 100. Thus, the controller 140 can successfully authenticate the smartphone 300 when the certificate information registered in the controller 140 corresponds to the certificate information received from the smartphone 300.

(Process Sequence Performed by Vehicle Lending and Borrowing System 10)

Figure 5:
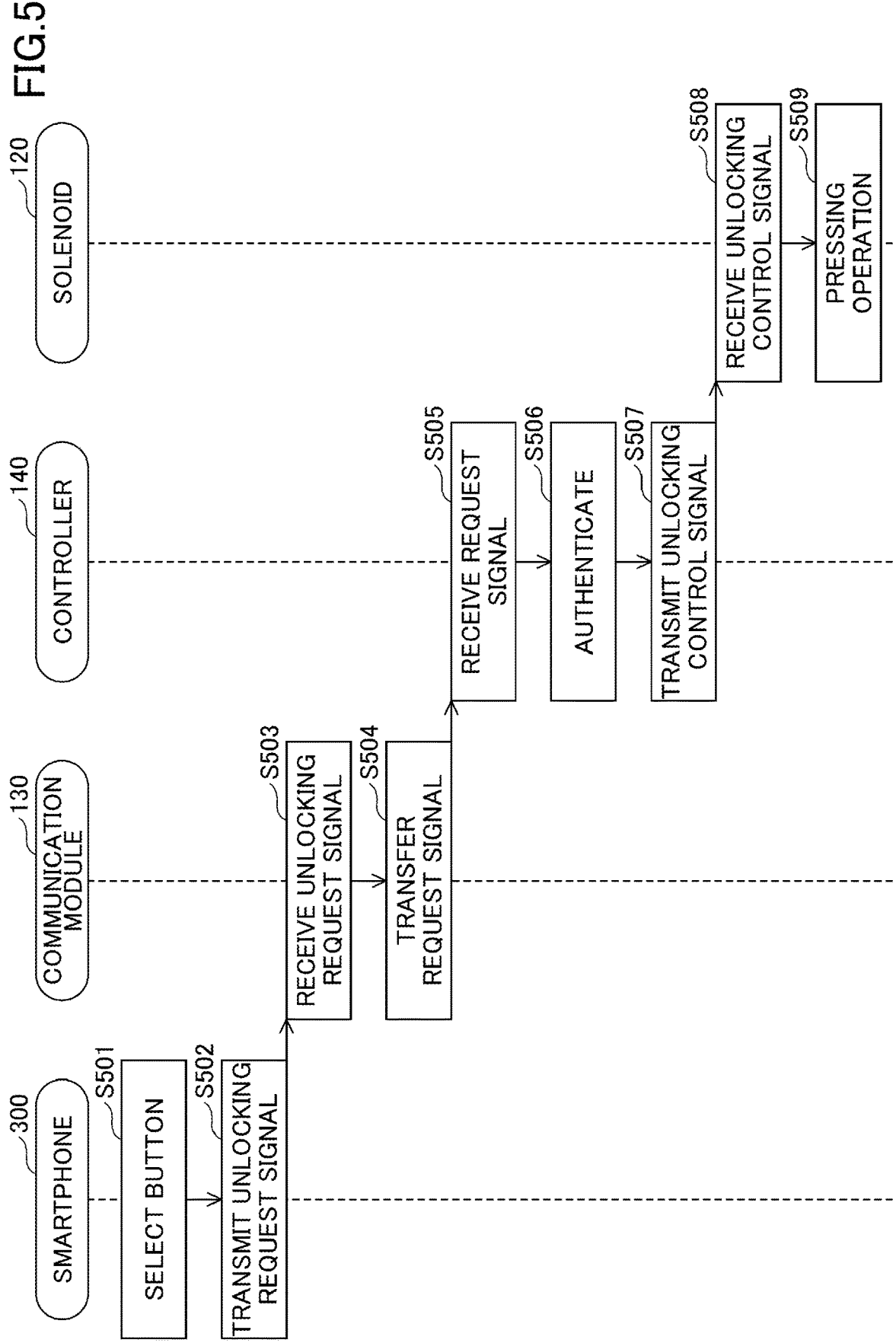
FIG. 5 is a diagram depicting a process sequence of the vehicle lending and borrowing system according to the embodiment.

FIG. 5 is a diagram depicting a process sequence performed by the vehicle lending and borrowing system 10 according to the embodiment. Hereinafter, the process sequence for unlocking doors of a vehicle using the vehicle's borrower's smartphone 300 will be described.

First, near the vehicle, when the vehicle borrower performs a predetermined operation on a predetermined application (e.g., an operation to select a predetermined button) from the smartphone 300 carried by the vehicle borrower in step S501, the smartphone 300 transmits an unlocking request signal via wireless communication to the communication module 130 of the storage case 100 set in the vehicle (step S502).

Note that the smartphone 300 includes previously obtained certificate information in the unlocking request signal. The certificate information is information to certify that the vehicle has been permitted to be lent to the vehicle borrower. The method of obtaining the certificate information by the smartphone 300 may be any method. For example, the smartphone 300 may obtain the certificate information from another smartphone used by the vehicle's lender via wireless communication, an email, a social networking service (SNS), or the like. For example, the smartphone 300 may obtain the certificate information from the server 350 that provides the certificate information through the communication network 12. It is preferable that a usable period is set in the certificate information. This prevents the doors of the vehicle from being unlawfully unlocked outside the usable period.

In the storage case 100, when the communication module 130 receives the unlocking request signal (step S503), the communication module 130 transfers the unlocking request signal to the controller 140 (step S504).

When the controller 140 receives the unlocking request signal (step S505), the authentication unit 141 of the controller 140 authenticates the smartphone 300 based on the certificate information included in the unlocking request signal (step S506).

When the authentication of the smartphone 300 is successful, the pressing control unit 142 of the controller 140 transmits a predetermined unlocking control signal to the solenoid 120 (step S507).

When receiving the unlocking control signal (step S508), the solenoid 120 drives the pressing part 121 and causes the pressing part 121 to perform a pressing operation on the unlocking button 212 (step S509).

This causes the electronic key 200 to transmit an operation signal for unlocking the locking mechanism of the doors of the vehicle to the in-vehicle device. For example, the electronic key 200 transmits an operation signal to the in-vehicle device through UHF band communication (315 MHz). The operation signal includes an authentication ID with respect to the electronic key 200. The in-vehicle device authenticates the electronic key 200 based on the authentication ID included in the operation signal received from the electronic key 200. When the in-vehicle device has successfully authenticated the electronic key 200, the locking mechanism of the doors of the vehicle unlocks the doors. The vehicle borrower then opens the door of the vehicle and withdraws the electronic key 200 from the storage case 100. This allows the vehicle borrower to use the vehicle using the electronic key 200.

As described above, the storage case 100 according to the embodiment that is set inside the vehicle, includes the case body 110 having the storage space 112 to insert the vehicle's electronic key 200 thereinto and remove the vehicle's electronic key 200 therefrom through the opening 114; the solenoid 120 having the pressing part 122 configured to protrude toward the storage space 112 and press at least the unlocking button 212 of the electronic key 200 stored in the storage space 112; the communication module 130 for communicating with the smartphone 300; and the pressing control unit 142 for causing the solenoid 120 to press the unlocking button 212 when a predetermined unlocking request signal transmitted from the smartphone 300 is received by the communication module 130.

Thus, in the storage case 100 according to the embodiment, the electronic key 200 is stored in the storage case 100 by the lender of the vehicle in a state where the storage case 100 is set inside the vehicle, thereby enabling the borrower of the vehicle to unlock the vehicle from the smartphone 300. Thus, with the storage case 100 according to the embodiment, there is no need for the lender to hand over the electronic key 200 directly to the borrower. Thus, with the storage case 100 according to the embodiment, the key of the vehicle can be delivered in a non-face-to-face manner without a key-storage box being set outside of the vehicle.

Further, with the storage case 100 according to the embodiment, what the vehicle lender should perform is only to set the storage case 100 at any location (e.g., in a glove box) inside the vehicle and insert the electronic key 200 into the storage case 100. The storage case 100 according to the embodiment has a relatively simple and versatile configuration in which the unlocking button 212 is pressed by the solenoid 120. Therefore, for the storage case 100 according to the embodiment, a special task dedicated for a particular manufacturer or dedicated for a particular vehicle type (e.g., a task to perform harnesses routing on a vehicle side, decoding of transmitted and received signals with respect to an electronic key, etc.) are not required, and thus, the storage case 100 can be relatively easily and versatilely set and used.

The storage case 100 according to the embodiment further includes the authentication unit 141 for authenticating the smartphone 300 based on certificate information transmitted from the smartphone 300, and the pressing control unit 142 causes the solenoid 120 to press the unlocking button 212 when the smartphone 300 has been successfully authenticated by the authentication unit 141.

This allows the storage case 100 according to the embodiment to unlock the vehicle only from the borrower's smartphone 300 which is authorized to use the vehicle, thus preventing unauthorized use of the vehicle by an unauthorized user who is not authorized to use the vehicle.

The storage case 100 according to the embodiment is provided with the storage space 112 and further includes the leaf springs 116 which press the outer surfaces of the electronic key 200 and which are elastically deformable in accordance with the size of the electronic key 200.

Thus, the storage case 100 according to the embodiment can securely hold the electronic key 200 in the storage space 112 regardless of the size of the electronic key 200, and is therefore versatile for any one of variety of vehicle types.

Although storage cases and vehicle lending and borrowing systems have been described with reference to the embodiments, the present invention is not limited to these embodiments, and various modifications or variations can be made within the scope of the present invention.

For example, the storage case 100 of the embodiment can be used in a variety of ways other than the vehicle lending and borrowing system 10. As an example, the storage case 100 of the embodiment may also be used in a delivery system for making deliveries in a non-face-to-face manner. A specific procedure of using the delivery system will now be described.

(1) A recipient of a delivery inserts an electronic key 200, having an unlocking button configured to unlock a trunk of a vehicle A, into the storage case 100 set in the vehicle A owned by the recipient.

(2) A delivery person who will make a delivery performs a predetermined operation on his or her own smartphone 300. Thus, the smartphone 300 transmits an unlocking request signal, including previously obtained certificate information, to the storage case 100 set in the vehicle A.

(3) In response to receiving the unlocking request signal, the storage case 100 set in the vehicle A performs authentication based on the certificate information, and, in response to successful authentication, the solenoid 120 presses the unlocking button of the electronic key 200. This unlocks the trunk of the vehicle A.

(4) The delivery person stores the delivery in the thus unlocked trunk and closes the trunk. Then, for example, the delivery person inputs a completion message into his or her own smartphone 300. This may, for example, cause a server of a delivery system to transfer the completion message to a smartphone or the like of the recipient of the delivery.

(5) The recipient of the delivery can receive the delivery stored in the trunk by unlocking the trunk using his or her own smartphone or another key for the vehicle A. Thus, the recipient can receive the delivery in a non-face-to-face manner.

Second Embodiment

Next, a storage case 400 according to a second embodiment will be described with reference to FIGS. 6-17C.

(Overview of Storage Case 400)

Figure 6:
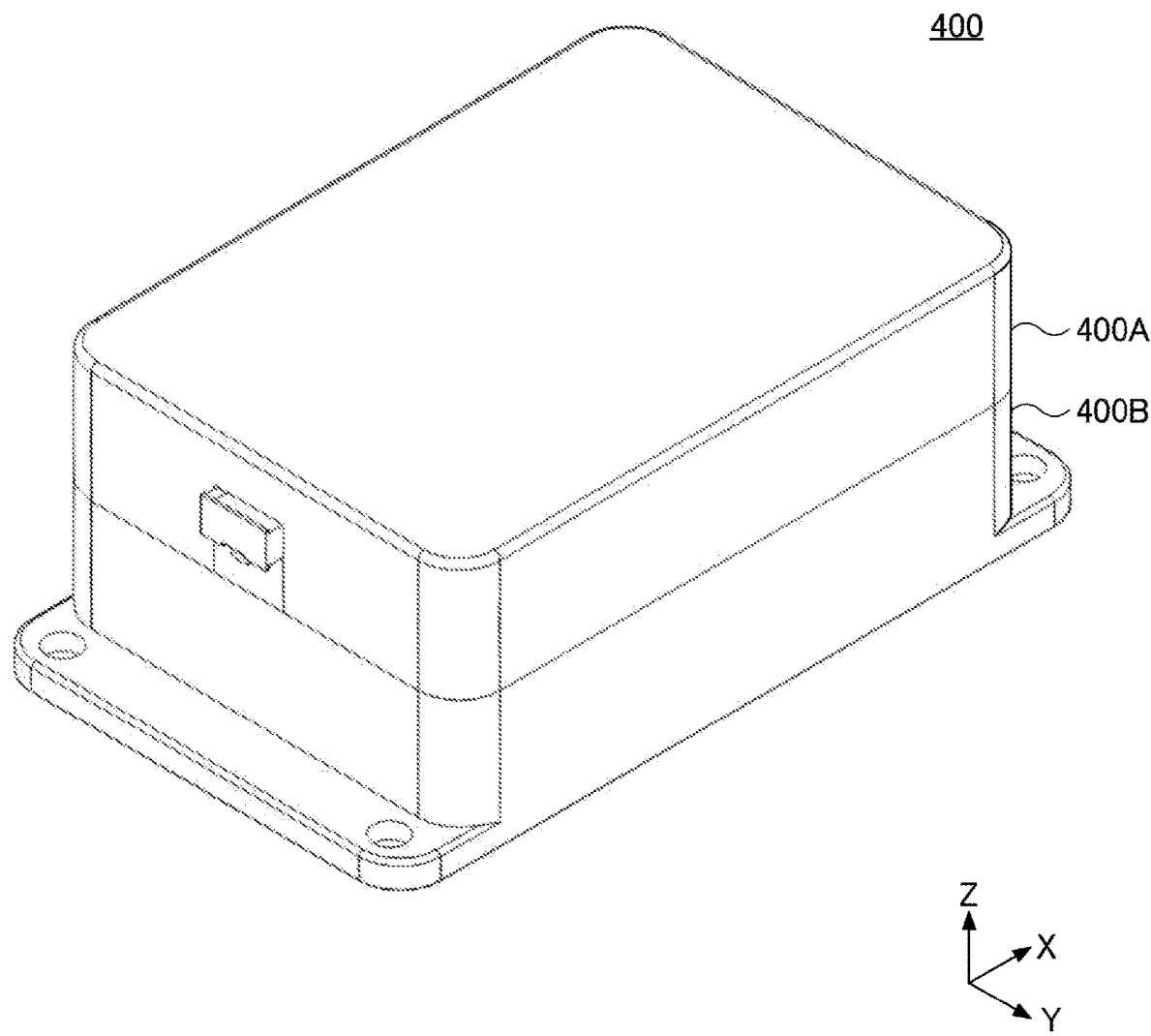
FIG. 6 is a perspective view of an external appearance of a storage case (in a state in which an upper case section and a lower case section are coupled) according to a second embodiment.
Figure 7:
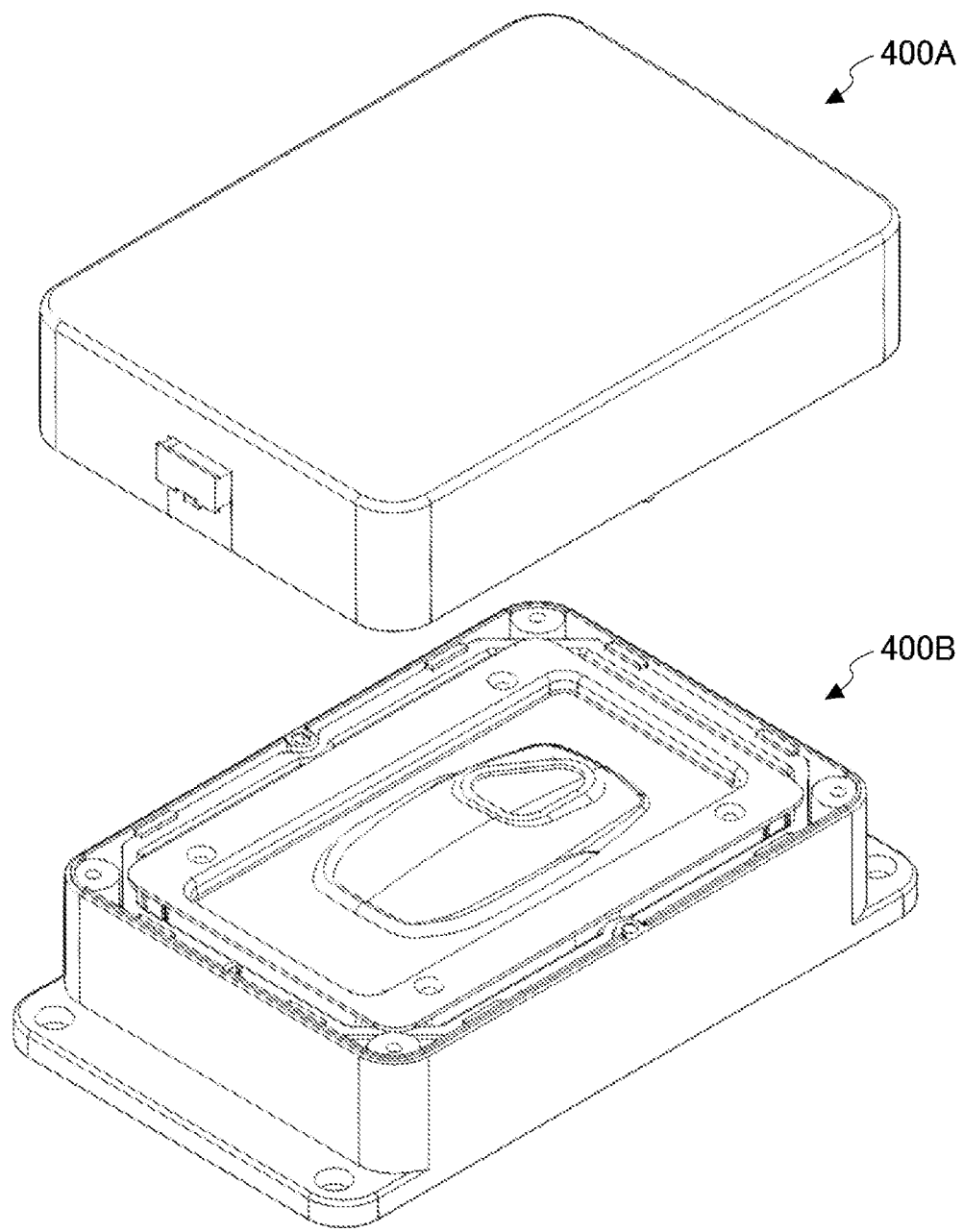
FIG. 7 is a perspective view of an external appearance of the storage case (in a state in which the upper case section and the lower case section are separated) according to the second embodiment.

FIG. 6 is a perspective view of an external appearance of the storage case 400 (in a state in which an upper case section 400A and a lower case section 400B are joined to each other) according to the second embodiment. FIG. 7 is a perspective view of an external appearance of the storage case 400 (in a state in which the upper case section 400A and the lower case section 400B are separated from each other) according to the second embodiment.

In the following description, for convenience, an X-axis direction in the drawings (a longer-side direction of the storage case 400) is set to a back and forth direction, a Y-axis direction in the drawings (a shorter-side direction of the storage case 400) is set to a right and left direction, and a Z-axis direction in the drawings (a thickness direction of the storage case 400) is set to an up and down direction.

The storage case 400 is configured to store an electronic key 500 and can be set at a desired place in a vehicle. As depicted in FIG. 6, the storage case 400 has a rectangular external shape. However, the storage case 400 is not limited to have such an external shape, and the storage case 400 may have another external shape.

Similar to the storage case 100 according to the first embodiment, the storage case 400 is configured to operate actuators 470A and 470B inside the storage case 400 through remote control from the smartphone 300 to press a locking button 511 and an unlocking button 512 of the electronic key 500. This allows a user to lock and unlock the vehicle through remote control using the smartphone 300.

As depicted in FIG. 7, the storage case 400 can be separated into the upper case section 400A and the lower case section 400B. The upper case section 400A accommodates the actuators 470A and 470B (see FIG. 9, etc.). The lower case section 400B accommodates the electronic key 500 and so forth.

The storage case 400 is configured to press the unlocking button 512 and the locking button 511 of the electronic key 500 accommodated in the lower case section 400B using the actuators 470A and 432 accommodated in the upper case section 400A, in a state in which the upper case section 400A and the lower case section 400B are joined as depicted in FIG. 6.

(Structure of Lower Case Section 400B)

Figure 8:
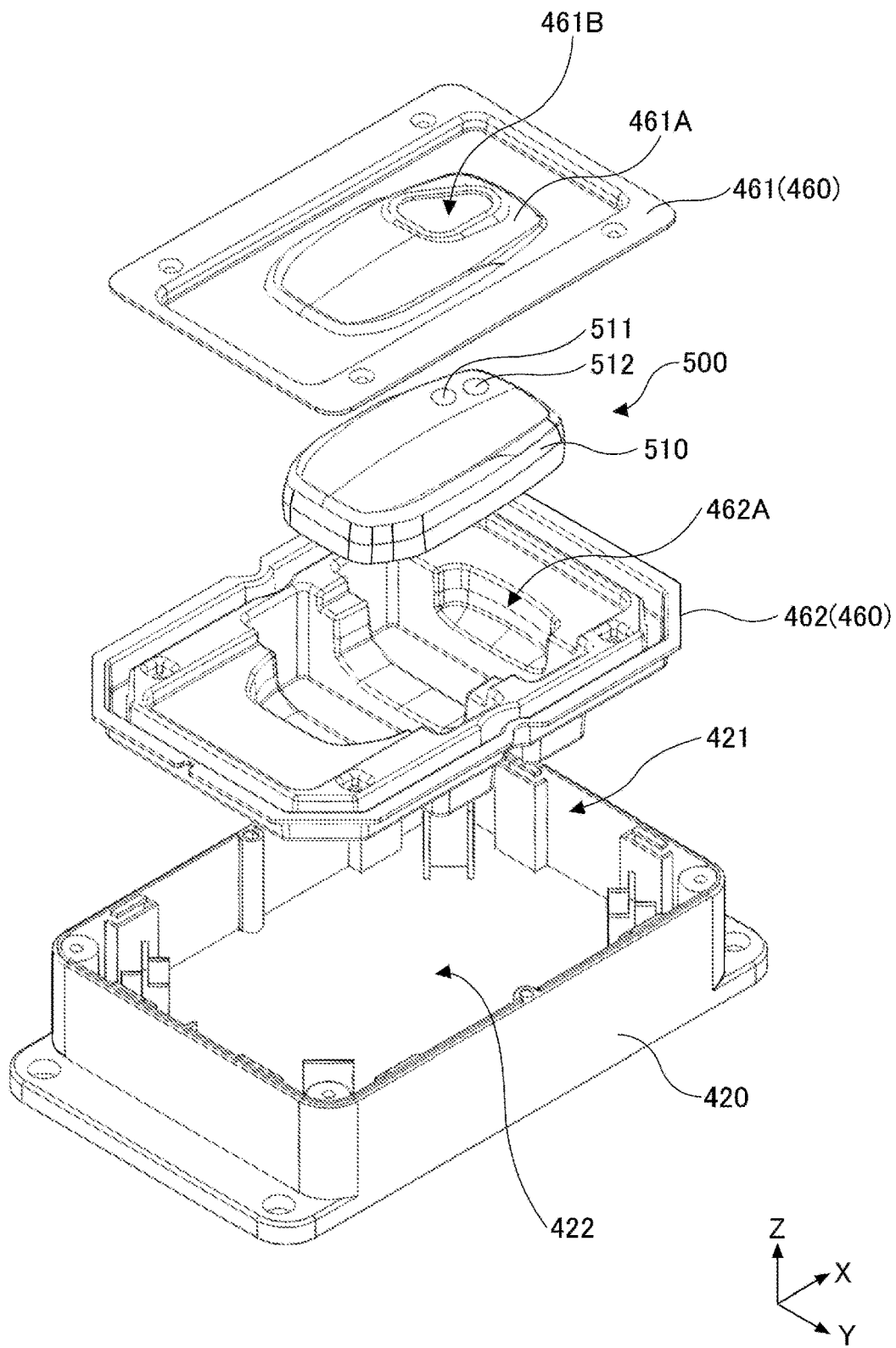
FIG. 8 is an exploded perspective view of a structure of the lower case section of the storage case according to the second embodiment.

FIG. 8 is an exploded perspective view of a structure of the lower case section 400B of the storage case 400 according to the second embodiment. As depicted in FIG. 8, the lower case section 400B includes a blister 460, the electronic key 500, and a lower case 420.

The electronic key 500 is a portable key device carried by a user of a vehicle; an electronic key system includes the electronic key 500 and an in-vehicle device (not depicted) mounted in the vehicle. As depicted in FIG. 8, the electronic key 500 includes a case 510. The case 510 is a container-like part having a generally thin rectangular shape formed of a resin material such as an ABS resin, a PC resin, or the like. The unlocking button 512 and the locking button 511 are exposed on an upper surface of the case 510. Both the unlocking button 512 and the locking button 511 can be pressed by the user. When the unlocking button 512 or the locking button 511 is pressed by the user, the electronic key 500 transmits, through wireless communication with the in-vehicle device, an operation signal to the in-vehicle device for unlocking or locking doors of the vehicle through a locking mechanism through a locking mechanism. This allows the electronic key 500 to remotely unlock or lock the vehicle doors through the locking mechanism. The electronic key 500 is what is known as a "smart key". Therefore, by remotely controlling the electronic key 500 from the smartphone 300, the user can start an engine of the vehicle after unlocking the vehicle without taking out the electronic key 500 from the storage case 400.

The blister 460 is a component that accommodates and holds the electronic key 500. The blister 460 can be separated into an upper blister 461 and a lower blister 462.

The lower blister 462 is a container-like member having a downwardly hollow recess 462A. The recess 462A has substantially the same shape as an outer shape of a lower portion of the electronic key 500. The lower blister 462 is configured to hold the lower portion of the electronic key 500 as a result of the lower portion of the electronic key 500 being fit into the recess 462A. A portion of the recess 462A is slightly smaller in size than outer dimensions of the lower portion of the electronic key 500 so that the case 510 can be sandwiched and held by the portion of the recess 462A. This allows the recess 462A to stably hold the lower portion of the electronic key 500 at a predetermined position.

The upper blister 461 is a lid-like member configured to cap the lower blister 462. The upper blister 461 closes the recess 462A of the lower blister 462 as a result of being fit into the lower blister 462. Thus, the upper blister 461 can prevent the electronic key 500 from becoming dislodged and falling out from the recess 462A of the lower blister 462. The upper blister 461 has an upwardly hollow recess 461A. The recess 461A is substantially the same shape as an upper outer shape of an upper portion of the electronic key 500. The upper blister 461 is configured to hold the upper portion of the electronic key 500 as a result of the upper portion of the electronic key 500 being fit into the recess 461A. An opening 461B is formed in the recess 461A of the upper blister 461. The opening 461B allows the unlocking button 512 and the locking button 511 to be pressed from above the blister 460 through the opening 461B provided above the unlocking button 512 and the locking button 511.

Sheet-like members of a resin material (e.g., polycarbonate) are pressed to form the recess 461A, the opening 461B, and the recess 462A of the blister 460, with their shapes and positions made to be in accordance with an external shape of the electronic key 500 and positions of the unlocking button 512 and locking button 511 of the electronic key 500. That is, the storage case 400 according to the second embodiment is configured to stably accommodate and hold any one of a plurality of types of electronic keys 500 in the lower case 420 as a result of the blister 460 being formed in accordance with a shape of the electronic key 500 for each type of the electronic keys 500.

The lower case 420 is a container-like member that acts as a housing of the lower case section 400B. The lower case 420 is formed of a resin material such as an ABS resin, a PC resin, or the like. The lower case 420 has an upper opening 421 and an accommodating space 422. The accommodating space 422 of the lower case 420 accommodates the blister 460 that holds the electronic key 500 put therein through the upper opening 421. Thus, the lower case 420 is configured to stably hold the electronic key 500 in a predetermined orientation in the accommodating space 422.

(Configuration of Upper Case Section 400A)

Figure 9:
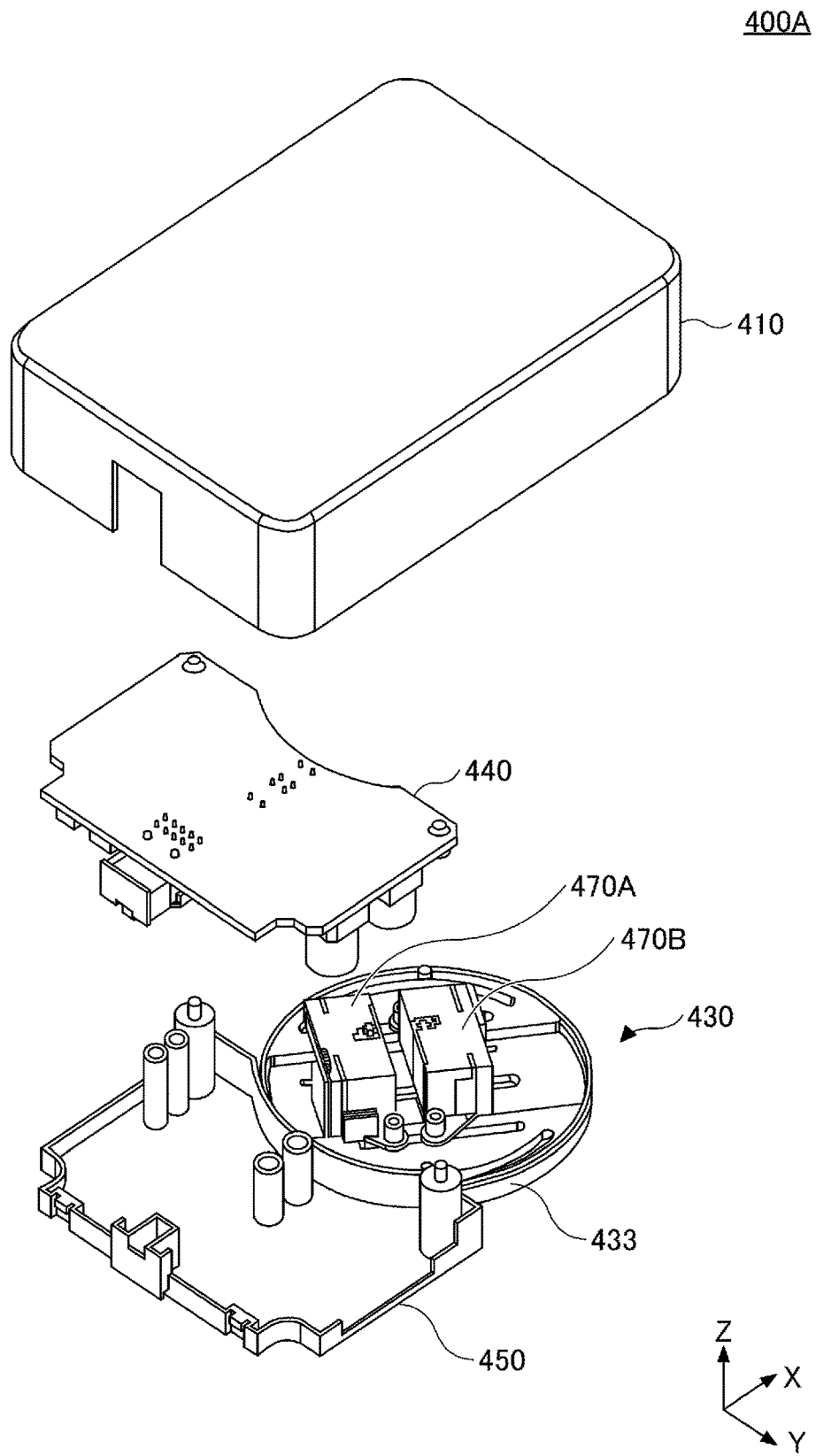
FIG. 9 is an exploded perspective view of a structure of the upper case section of the storage case according to the second embodiment.
Figure 10:
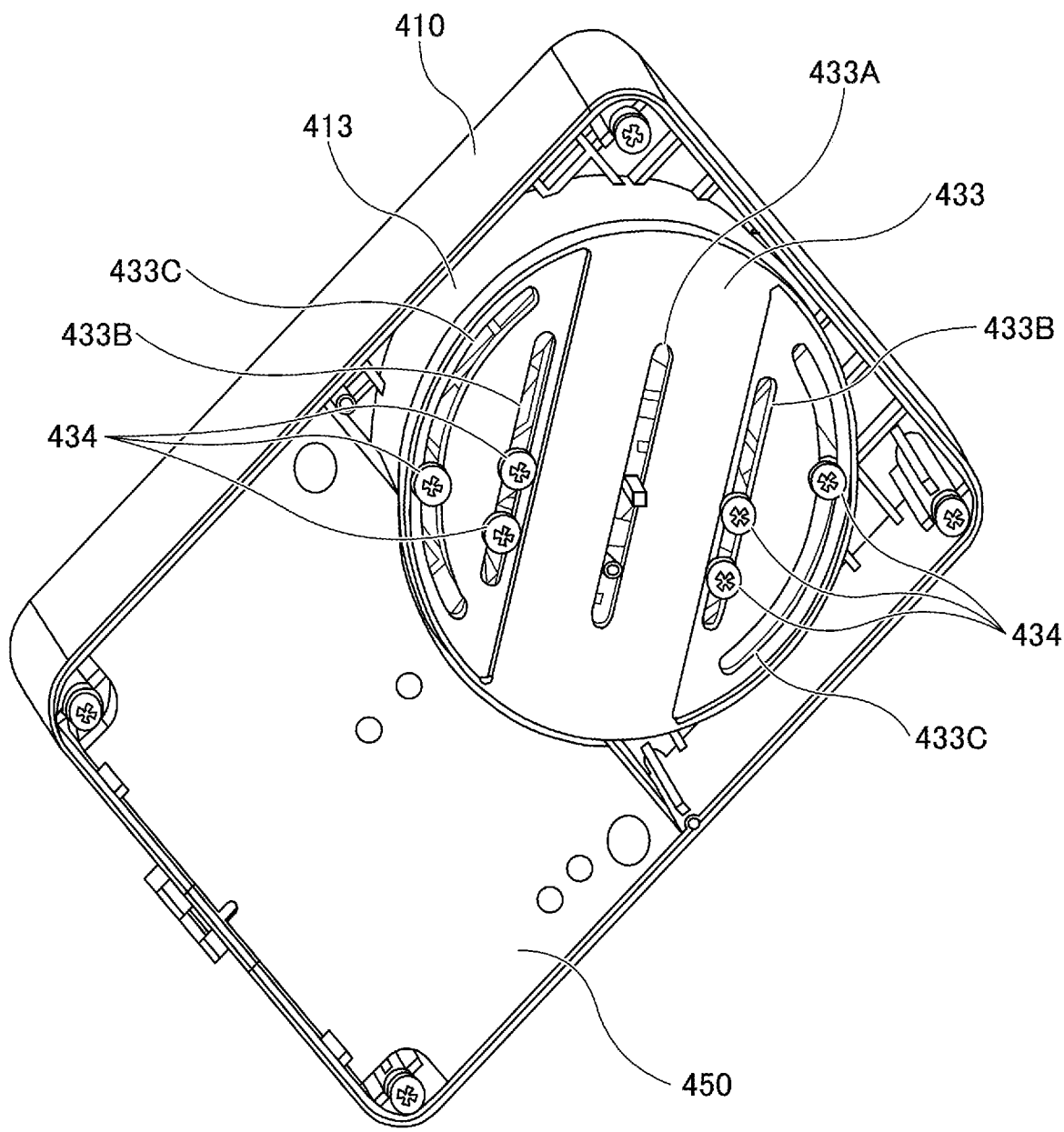
FIG. 10 is a perspective view of an external appearance of the upper case section of the storage case according to the second embodiment viewed from a lower side.
Figure 11:
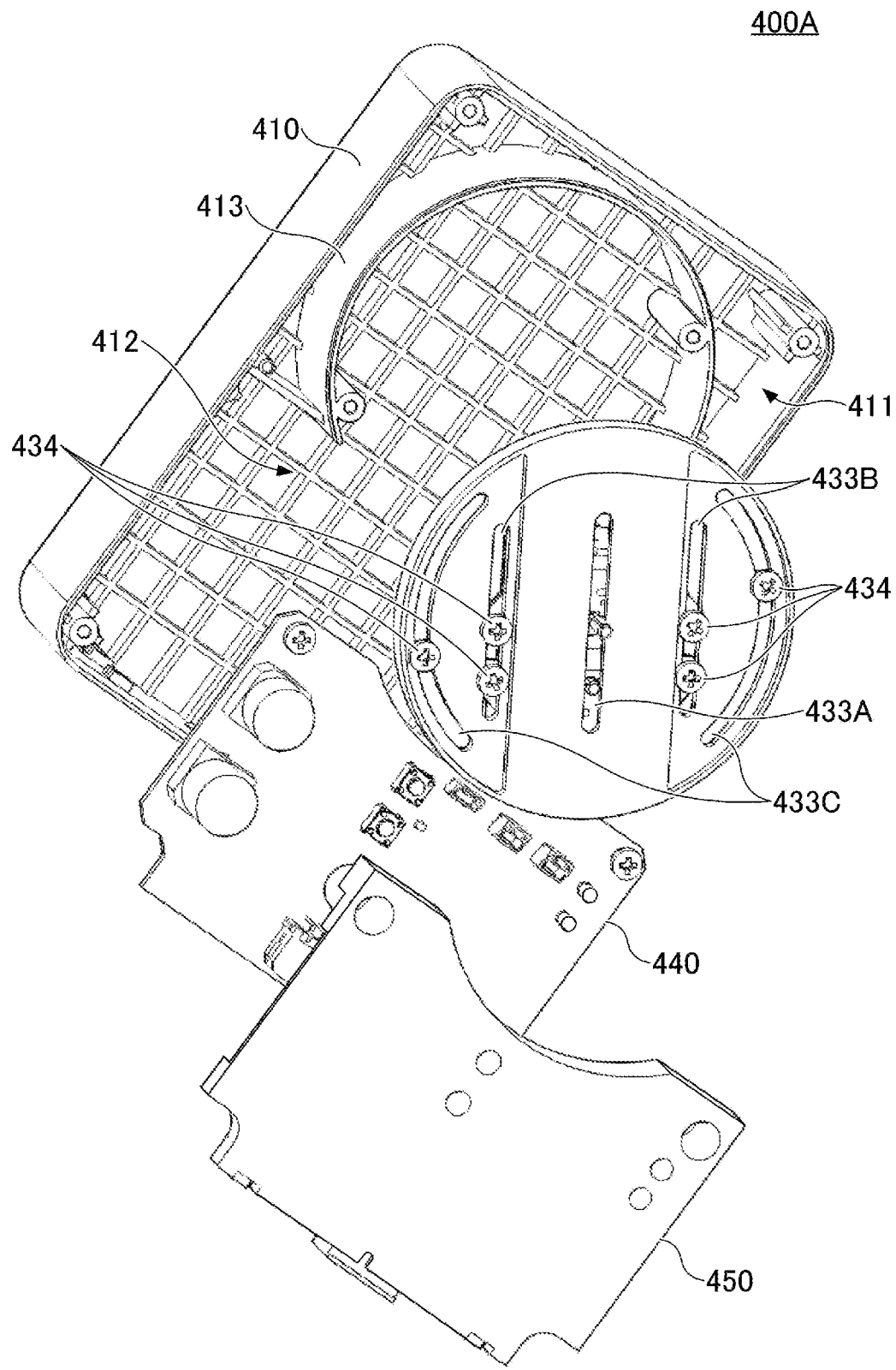
FIG. 11 is an exploded perspective view of a structure of the upper case section of the storage case according to the second embodiment viewed from a lower side.
Figure 12:
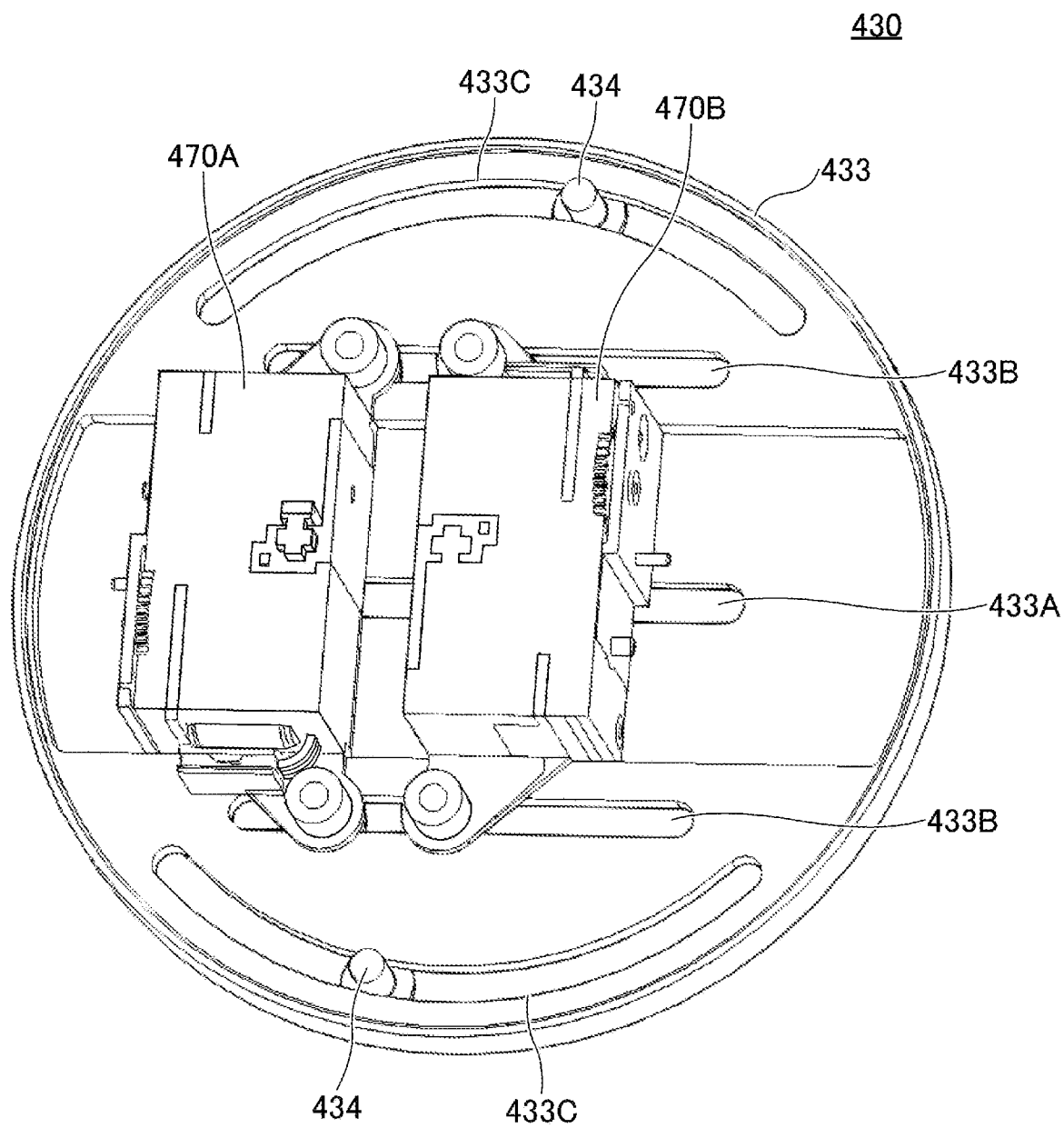
FIG. 12 is a perspective view of an external appearance of a driving unit of the storage case according to the second embodiment viewed from an upper side.
Figure 13:
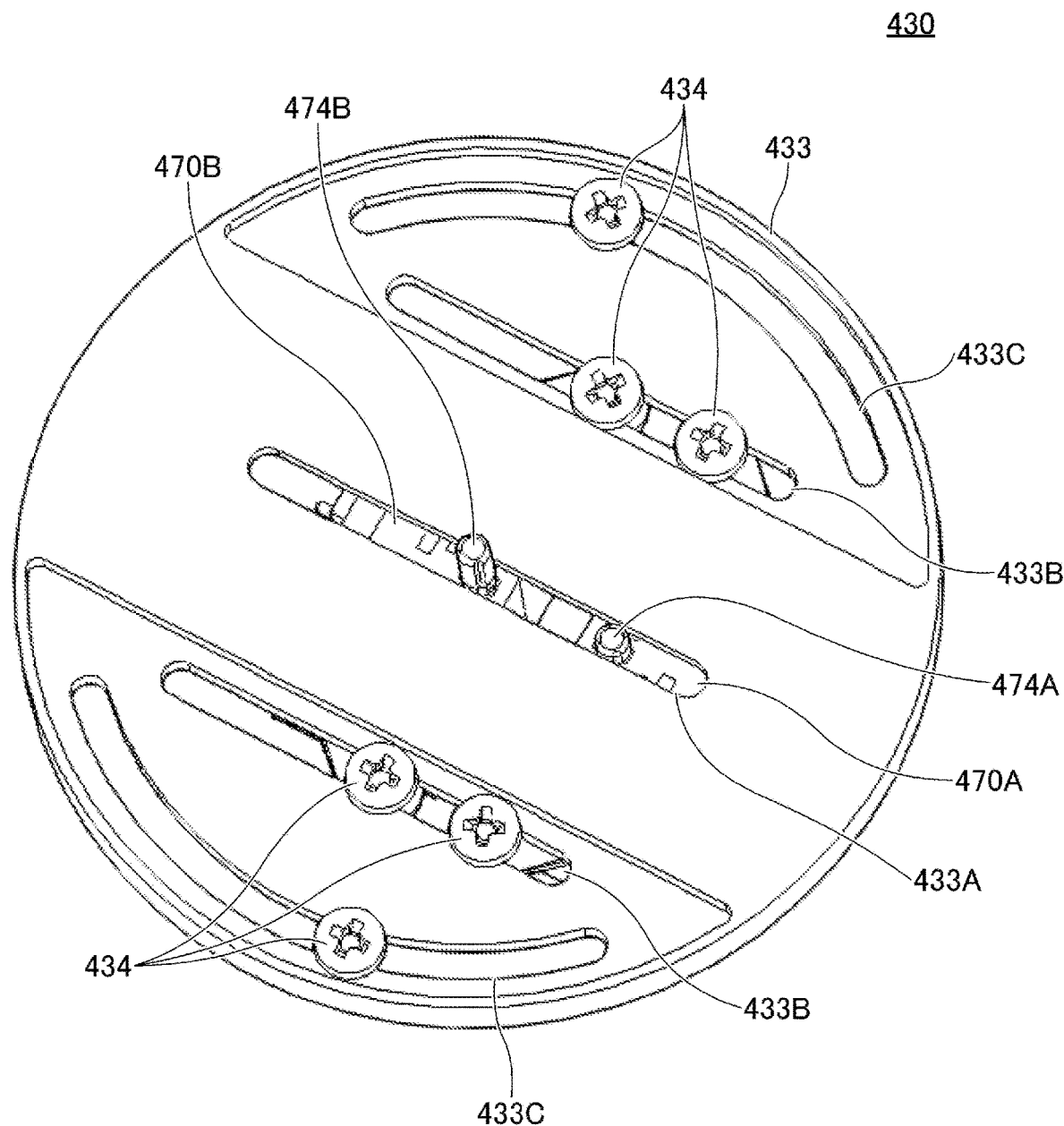
FIG. 13 is a perspective view of an external appearance of the driving unit of the storage case according to the second embodiment viewed from a lower side.

FIG. 9 is an exploded perspective view depicting a structure of the upper case section 400A of the storage case 400 according to the second embodiment. FIG. 10 is a perspective view of an external appearance of the upper case section 400A of the storage case 400 according to the second embodiment viewed from of a lower side. FIG. 11 is an exploded perspective view of a structure of the upper case section 400A of the storage case 400 according to the second embodiment. FIG. 12 is a perspective view of an external appearance of the driving unit 430 of the storage case 400 according to the second embodiment viewed from a upper side. FIG. 13 is a perspective view of an external appearance of the driving unit 430 of the storage case 400 according to the second embodiment viewed from a lower side.

As depicted in FIGS. 9-11, the upper case section 400A includes the driving unit 430, a circuit board 440, a cover 450, and an upper case 410.

The driving unit 430 includes an actuator 470A, an actuator 470B, and a rotating plate 433. The rotating plate 433 is an example of an "adjustment piece". The rotating plate 433 is a disk-like member formed of a resin material such as an ABS resin, a PC resin, or the like. The rotating plate 433 is rotatable on a XY plane inside a hollow cylinder 413 of the upper case 410.

As depicted in FIGS. 10-13, in the rotating plate 433, a linear groove 433A passing through a center of the rotating plate 433 and extending linearly in a radial direction of the rotating plate 433 is formed. In the rotating plate 433, also formed is a pair of linear grooves 433B sandwiching the linear groove 433A, parallel to the linear groove 433A, and extending linearly in a radial direction of the rotating plate 433.

In addition, in the rotating plate 433, as depicted in FIGS. 10-13, a pair of curved grooves 433C is provided point symmetrically with respect to the center of the rotating plate 433. Each of the pair of curved grooves 433C extends curvilinearly along an outer edge of the rotating plate 433. Each of the pair of curved grooves 433C has a length corresponding to a 45 degree angle of rotation of the rotating plate 433. A screw 434 passes through each of the pair of curved grooves 433C from a bottom side of the rotating plate 433. Thereby, the rotating plate 433 is restricted in its rotatable angle range to 45 degrees by the pair of screws 434 which passes through the pair of curved grooves 433C. The rotating plate 433 is screwed to the upper case 410 by the pair of screws 434 which passes through the pair of curved grooves 433C.

The actuator 470A is an example of a "second actuator". The actuator 470B is an example of a "first actuator". The actuator 470A and the actuator 470B face each other on a top side of rotating plate 433. The actuator 470A and the actuator 470B are movable radially with respect to the rotating plate 433 along the pair of linear grooves 433B formed in the rotating plate 433. The actuator 470A and the actuator 470B are screwed from a back side of the rotating plate 433 by the pair of screws 434 passing through the pair of linear grooves 433B and thus secured at certain positions in the pair of linear grooves 433B.

The actuator 470A has a rod 474A (an example of a "second pressing piece") protruding downwardly from a bottom side. The actuator 470A is positioned through the above-described rotational and radial positional adjustments so that the rod 474A faces the locking button 511 of the electronic key 500. The actuator 470A is configured to press the locking button 511 by a tip of the rod 474A passing through the linear groove 433A of the rotating plate 433 as a result of the rod 474A being moved downwardly as being driven by the motor 472 in response to a driving current supplied from the circuit board 440. After the rod 474A presses the locking button 511, the motor 472 of the actuator 470A is driven in a reverse rotation direction, so that the rod 474A rises and returns to an initial position.

The actuator 470B has a rod 474B (an example of a "first pressing piece") protruding downwardly from a bottom side. The actuator 470B is positioned through the above-described rotational and radial positional adjustments so that the rod 474B faces the unlocking button 512 of the electronic key 500. The actuator 470B is configured to press the unlocking button 512 by a tip of the rod 474B which passes through the linear groove 433A of the rotating plate 433 as a result of the rod 474B being moved downward as being driven by the motor 472 in response to a driving current supplied from the circuit board 440. After the rod 474B presses the unlocking button 512, the motor 472 of the actuator 470B is driven in a reverse rotation direction, so that the rod 474B rises and returns to an initial position.

The driving unit 430 is configured to adjust a radial position of the actuators 470A and 470B along the two linear grooves 433A. The driving unit 430 is configured to adjust also an orientation of the pair of linear grooves 433B by rotating the rotating plate 433. This allows the driving unit 430 to adjust the orientation in which the actuators 470A and 470B face each other and directions of movements of the actuators 470A and 470B. The driving unit 430 is configured to adjust also the distance between the actuator 470A and the actuator 470B by moving either one of the actuator 470A and the actuator 470B along the two linear grooves 433A.

The circuit board 440 is a flat plate-like member in which various electronic components of electronic circuitry are mounted. For example, a PWB may be used as the circuit board 440. The circuit board 440 is accommodated at a rear side (a negative X-axis side) in an accommodating space 412 of the upper case 410. The circuit board 440 includes the communication module 130, the controller 140, and the battery 150 (see the first embodiment for these units).

A cover 450 is a flat plate-like member covering a bottom side of the circuit board 440 accommodated in upper case 410. The cover 450 is formed of a resin material such as an ABS resin, a PC resin, or the like.

The upper case 410 is a container-like member and serves as a housing of the upper case section 400A. The upper case 410 is formed of a resin material such as an ABS resin, a PC resin, or the like. The upper case 410 has a lower opening 411 and an accommodating space 412. The accommodating space 412 accommodates the driving unit 430, the circuit board 440, and the cover 450 that are put therein through the lower opening 411. The hollow cylinder 413 is formed at a front side (a positive X-axis side) in the accommodating space 412. Inside the hollow cylinder 413, the rotating plate 433 of the driving unit 430 is rotatably provided. The circuit board 440 and the cover 450 are positioned at a rear side (a negative X-axis side) in the accommodating space 412.

(Configuration of Actuators 470A and 470B)

Figure 14:
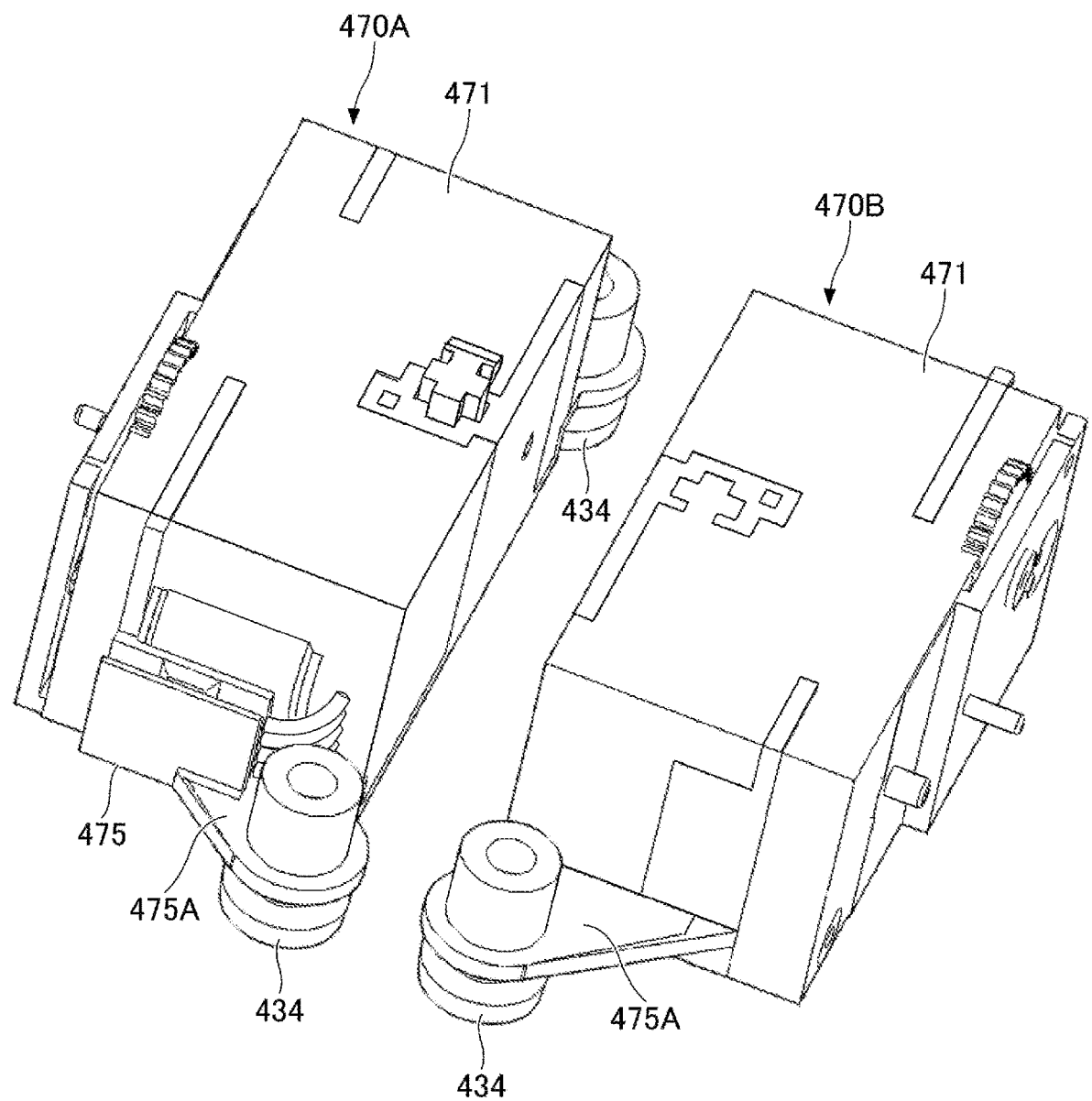
FIG. 14 is a perspective view of an external appearance of actuators of the storage case according to the second embodiment viewed from an upper side.
Figure 15:
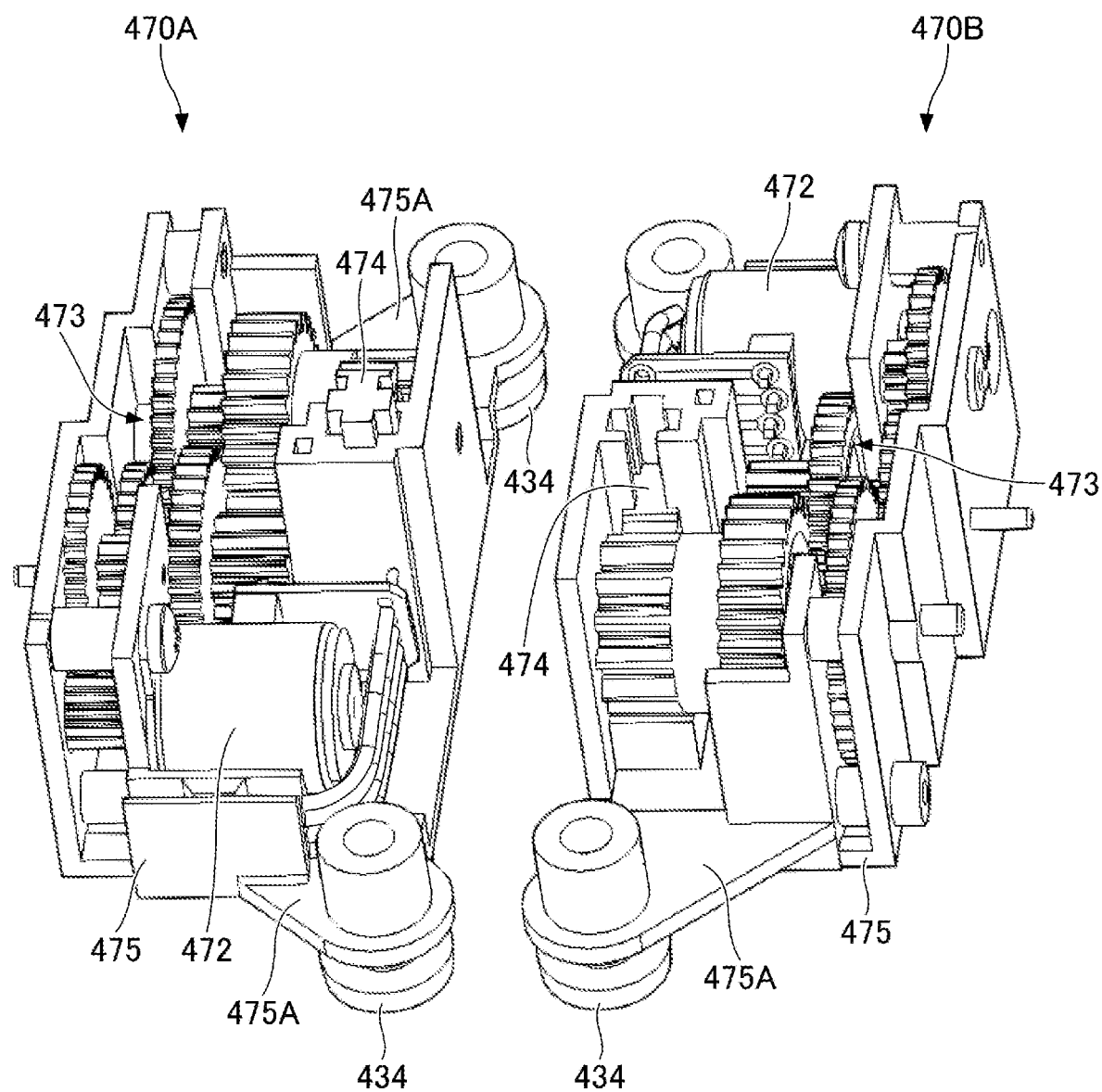
FIG. 15 is a perspective view of an external appearance of the actuators of the storage case according to the second embodiment viewed from an upper side (indication of the case is omitted).
Figure 16:
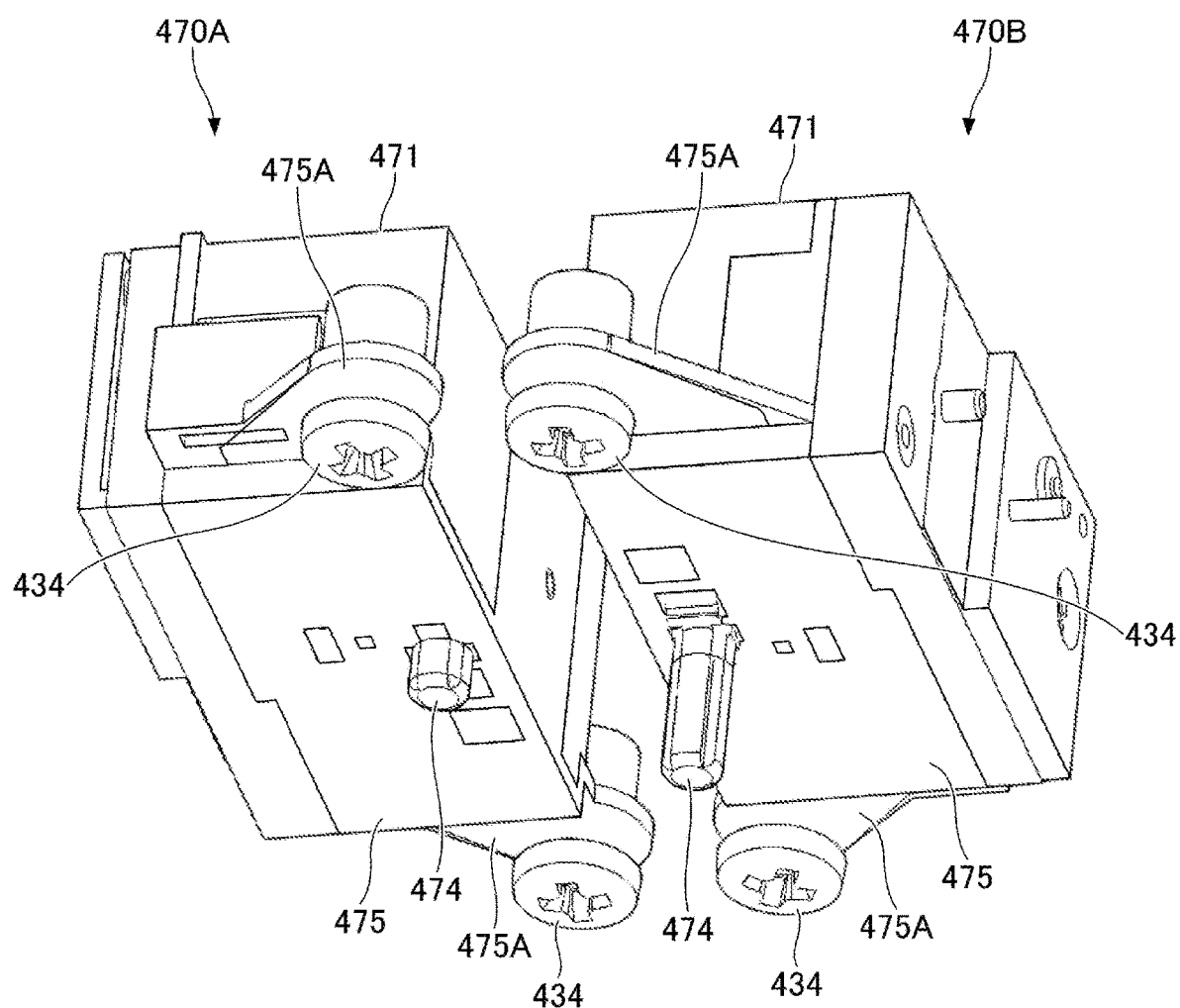
FIG. 16 is a perspective view of an external appearance of the actuators of the storage case according to the second embodiment viewed from a lower side.

FIG. 14 is a perspective view of an external appearance of the actuators 470A and 470B provided in the storage case 400 according to the second embodiment viewed from an upper side. FIG. 15 is a perspective view of an external appearance of the actuators 470A and 470B (indication of the case 471 being omitted) provided in the storage case 400 according to the second embodiment viewed from an upper side. FIG. 16 is a perspective view of an external appearance of the actuators 470A and 470B provided in the storage case 400 according to the second embodiment viewed from a lower side.

As depicted in FIGS. 14-16, the actuators 470A and 470B have configurations similar to each other. The actuator 470A and the actuator 470B have cases 471, motors 472, gear groups 473, rods 474, and bases 475. The cases 471 accommodate the motors 472, the gear groups 473, the rods 474, and the bases 475. The cases 471 have generally rectangular shapes with their lower sides open. The bases 475 support the motors 472, the gear groups 473, and the rods 474 inside the cases 471. The bases 475 close lower openings of the cases 471. Each of left and right sides of the bases 475 are provided with outwardly protruding seats 475A. The actuators 470A and 470B are screwed and secured to the rotating plate 433 and are restricted with respect to their directions of movements in the rotating plate 433 by the pair of screws 434 which passes through the pair of seats 475A. The gear groups 473 transmit driving forces of the motors 472 to the rods 474 while changing deceleration ratios. The rods 474 are configured to protrude downwardly from the bottom sides of the bases 475 as a result of being moved downwardly through the gear groups 473 that are driven by the motors 472 (see FIG. 16). For example, stepping motors are used as the motors 472.

The motor 472 of each of the actuators 470A and 470B is connected to the circuit board 440 by a wiring member (not depicted) such as an FPC. Thus, the motor 472 of each of the actuators 470A and 470B is configured to operate as a result of a driving current being supplied by the circuit board 440 via the wiring member.

As depicted in FIG. 16, the rod 474 of the actuator 470A protrudes downwardly from the bottom side of the base 475 at a position near the actuator 470B. Also the rod 474 of the actuator 470B protrudes downwardly from the bottom side of the base 475 at a position near the actuator 470A. Thus, in the storage case 400 according to the second embodiment, it is possible to reduce the minimum distance between the rod 474A and the rod 474B, and thus, the storage case according to the second embodiment can be suitably used also for the electronic key 500 having a small distance between the unlocking button 512 and the locking button 511.

(Setting Procedure of Storage Case 400)

Hereinafter, a setting procedure of the storage case 400 according to the second embodiment will be described.

(1) First, a lower portion of the electronic key 500 is fit into the recess 462A of the lower blister 462. (2) The upper blister 461 is then fit into the lower blister 462. As a result, the electronic key 500 is stored in the blister 460. As the blister 460, one having a shape corresponding to an outer shape of the electronic key is used.

(3) The blister 460 holding the electronic key 500 is then put into the accommodating space 422 of the lower case 420. This results in the electronic key 500 stably held in a predetermined orientation in the accommodating space 422.

(4) Next, positions of the two actuators 470A and 470B are adjusted to correspond to positions of the two buttons 511 and 512 of the electronic key 500. This adjustment is implemented through rotation of the rotating plate 433 and linear movements of the two actuators 470A and 470B with respect to the rotating plate 433.

(5) Next, an initial protruding amount of each of the two rods 474A and 474B is adjusted so that tips of the two rods 474A and 474B are near the two buttons 511 and 512 in a default state. This adjustment allows each of the two buttons 511 and 512 to be pressed through a slight downward stroke of each of the two rods 474A and 474B. That is, a required amount of stroke of each of the two rods 474A and 474B can be reduced, and thus a depression response with respect to each of the two buttons 511 and 512 can be improved.

(6) Next, the upper case section 400A and the lower case section 400B are connected to each other with a lower side portion of the upper case section 400A and an upper side portion of the lower case section 400B facing each other, and the upper case section 400A and the lower case section 400B are secured to each other with certain securing devices. This allows the tip of each of the two rods 474A and 474B to face a corresponding one of the two buttons 511 and 512 in a proximate state, and allows each of the two buttons 511 and 522 to be pressed through remote control from the smartphone 300.

(Example of Positional Adjustment of Actuators 470A and 470B)

Figure 17A:
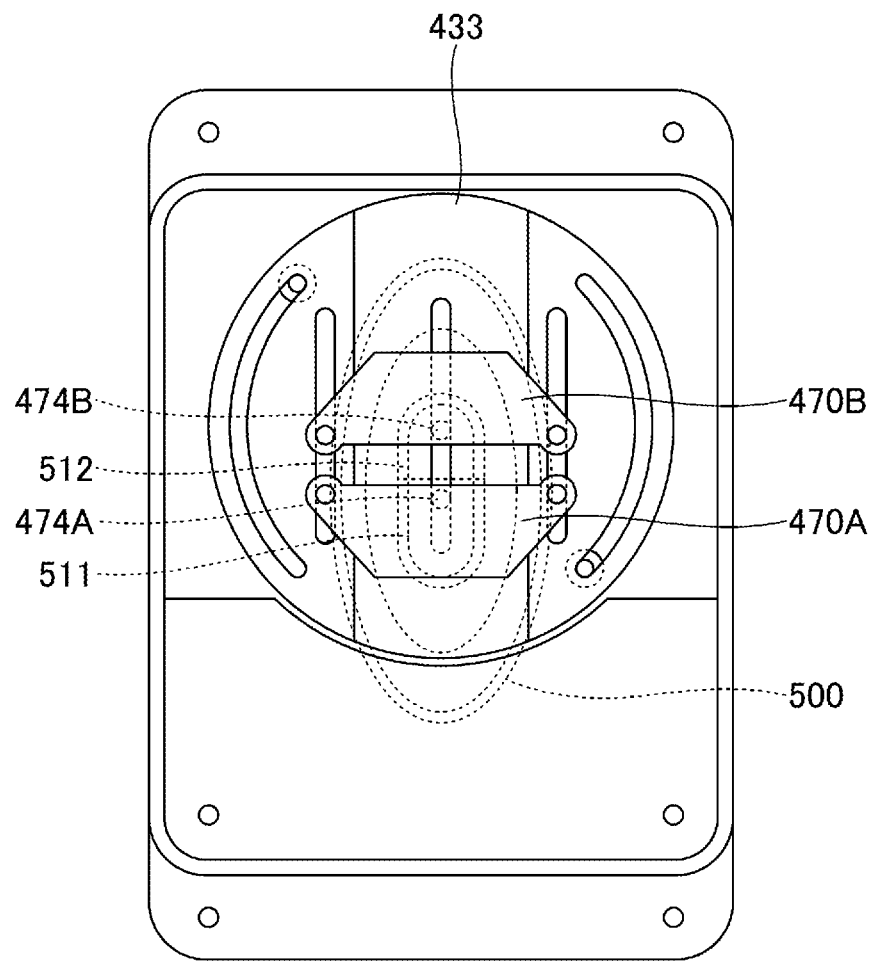
FIG. 17A depicts an example of adjusting positions of the actuators in the storage case according to the second embodiment.
Figure 17C:
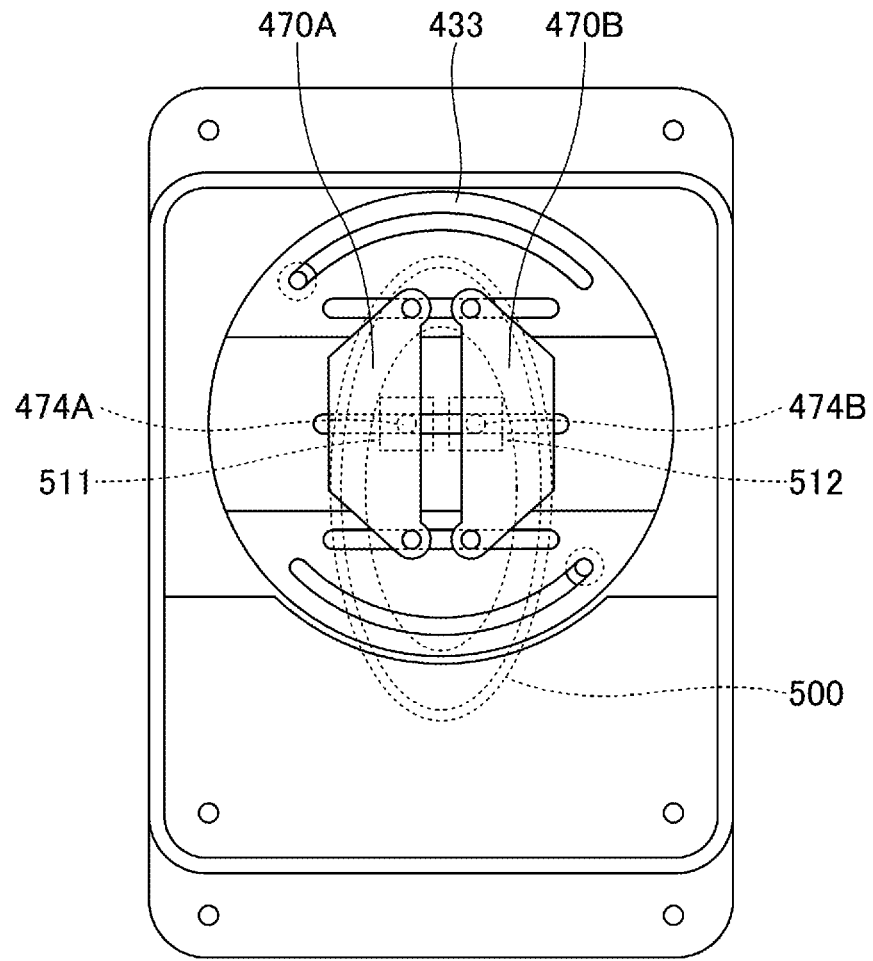
FIG. 17C depicts an example of adjusting the positions of the actuators in the storage case according to the second embodiment.

FIGS. 17A-17C are diagrams depicting an example of adjusting positions of the actuators 470A and 470B in the storage case 400 according to the second embodiment. In the storage case 400 according to the second embodiment, it is possible to adjust positions of the two actuators 470A and 470B in such a manner that the storage case 400 becomes suitable for any one of the electronic keys 500 with the two buttons 511 and 512 arranged side by side in various directions and having various distances therebetween.

For example, as depicted in FIG. 17A, in the electronic key 500, when the two buttons 511 and 512 are arranged side by side in a front and back direction (in the X-axis direction), each of the two actuators 470A and 470B can be positioned in such a manner that the two actuators 470A and 470B can press the two buttons 511 and 512, respectively, by adjusting through rotation of the rotating plate 433 a direction along which the two actuators 470A and 470B are arranged side by side to a front and back direction (the X-axis direction) and adjusting a distance between the two actuators 470A and 470B with respect to the rotating plate 433 in accordance with a distance between the two buttons 511 and 512.

For example, as depicted in FIG. 17C, when the two buttons 511 and 512 are arranged side by side in a left and right direction (i.e., the Y-axis direction) in the electronic key 500, each of the two actuators 470A and 470B can be positioned in such a manner that the two actuators 470A and 470B can press the two buttons 511 and 512, respectively, by adjusting through rotation of the rotating plate 433 a direction along which the two actuators 470A and 470B are arranged side by side to a left and right direction (the Y-axis direction) and adjusting a distance between the two actuators 470A and 470B with respect to the rotating plate 433 in accordance with a distance between the two buttons 511 and 512.

For example, as depicted in FIG. 17B, when the two buttons 511 and 512 are arranged side by side in an oblique direction (in a direction intersecting each of the X and Y axes) in the electronic key 500, each of the two actuators 470A and 470B can be positioned in such a manner that the two actuators 470A and 470B can press the two buttons 511 and 512, respectively, by adjusting through rotation of the rotating plate 433 a direction along which the two actuators 470A and 470B are arranged side by side to an oblique direction (in a direction intersecting each of the X and Y axes) and adjusting a distance between the two actuators 470A and 470B with respect to the rotating plate 433 in accordance with a distance between the two buttons 511 and 512.

What is claimed is:

1. A storage case configured to be provided in a vehicle, the storage case comprising:
    a case body including a storage space for an electronic key;
    a first actuator including a first pressing piece that is configured to protrude into the storage space, the first actuator being configured to press at least an unlocking button of the electronic key stored in the storage space with the first pressing piece;
    a second actuator including a second pressing piece that is configured to protrude into the storage space, the second actuator being configured to press at least a locking button of the electronic key stored in the storage space with the second pressing piece;
    an adjustment piece configured to adjust a position of the first actuator and adjust a position of the second actuator;
    a transceiver configured to communicate with an external terminal apparatus; and
    a processor configured to, in response to the transceiver receiving an unlocking request signal transmitted from the external terminal apparatus, cause the first actuator to press the unlocking button,
    wherein
    the adjustment piece includes a rotating plate rotatably provided with respect to the case body, and
    the first actuator and the second actuator are adjustable in positions with respect to the rotating plate to become nearer to each other and adjustable in positions with respect to the rotating plate to become farther from each other.

2. The storage case as claimed in claim 1,
    wherein
    the case body has an opening through which the electronic key may be inserted into and removed from the storage space.

3. The storage case as claimed in claim 1,
    wherein
    the processor is further configured to authenticate the external terminal apparatus based on certificate information transmitted from the external terminal apparatus, and in response to successful authentication of the external terminal apparatus, cause the first actuator to press the unlocking button.

4. The storage case as claimed in claim 1, further comprising an elastically deformable piece provided in the storage space, the elastically deformable piece being configured to press an outer surface of the electronic key, and being elastically deformable in accordance with a size of the electronic key.

5. The storage case as claimed in claim 1, wherein the case body comprises an upper case section and a lower case section separable from each other, the upper case section is configured to store the rotating plate, the first actuator, and the second actuator, and the lower case section is configured to store the electronic key.

6. The storage case as claimed in claim 5, further comprising a blister including a recess configured to hold the electronic key in a predetermined orientation, the blister being stored in the lower case section.

7. A storage case configured to be provided in a vehicle, the storage case comprising:

a case body including a storage space for an electronic key;

a first actuator including a first pressing piece that is configured to protrude into the storage space, the first actuator being configured to press at least an unlocking button of the electronic key stored in the storage space with the first pressing piece;

a second actuator;

an adjustment piece configured to adjust a position of the first actuator and adjust a position of the second actuator;

a transceiver configured to communicate with an external terminal apparatus; and a processor configured to, in response to the transceiver receiving an unlocking request signal transmitted from the external terminal apparatus, cause the first actuator to press the unlocking button, wherein the adjustment piece includes a rotating plate rotatably provided with respect to the case body, and the first actuator and the second actuator are adjustable in positions with respect to the rotating plate to become nearer to each other and adjustable in positions with respect to the rotating plate to become farther from each other.

8. A vehicle lending and borrowing system comprising:

the storage case claimed in claim 3; and a server configured to provide the certificate information to the external terminal apparatus that is permitted to use the vehicle.

\* \* \* \* \*